US010133636B2

(12) United States Patent
Ignomirello

(10) Patent No.: US 10,133,636 B2
(45) Date of Patent: Nov. 20, 2018

(54) DATA STORAGE AND RETRIEVAL MEDIATION SYSTEM AND METHODS FOR USING SAME

(71) Applicant: SYMBOLIC IO CORPORATION, Edison, NJ (US)

(72) Inventor: Brian Ignomirello, Colts Neck, NJ (US)

(73) Assignee: FORMULUS BLACK CORPORATION, Oceanport, NJ (US)

( * ) Notice: Subject to any disclaimer, the term of this patent is extended or adjusted under 35 U.S.C. 154(b) by 90 days.

(21) Appl. No.: 13/797,093

(22) Filed: Mar. 12, 2013

(65) Prior Publication Data
US 2014/0279911 A1    Sep. 18, 2014

(51) Int. Cl.
G06F 11/14    (2006.01)
G06F 17/30    (2006.01)

(52) U.S. Cl.
CPC ...... *G06F 11/1435* (2013.01); *G06F 11/1448* (2013.01); *G06F 17/30067* (2013.01)

(58) Field of Classification Search
CPC ............. G06F 11/1448; G06F 11/1435; G06F 17/30067
See application file for complete search history.

(56) References Cited

U.S. PATENT DOCUMENTS

| | | |
|---|---|---|
| 3,016,527 A | 1/1962 | Gilbert et al. |
| 3,739,410 A | 6/1973 | Fortin |
| 3,926,346 A | 12/1975 | Dub et al. |
| 4,183,464 A | 1/1980 | Babb |
| 4,286,256 A | 8/1981 | Langdon et al. |
| D264,844 S | 6/1982 | Tuck |
| 4,420,767 A | 12/1983 | Hodge et al. |
| 4,560,977 A | 12/1985 | Murakami et al. |
| 4,625,710 A | 12/1986 | Harada et al. |
| 4,635,141 A | 4/1987 | Coulter |
| D304,193 S | 10/1989 | Lotz |
| D308,671 S | 6/1990 | Aderman et al. |
| 4,931,340 A | 6/1990 | Baba et al. |
| D319,765 S | 9/1991 | McCord |

(Continued)

FOREIGN PATENT DOCUMENTS

| | | |
|---|---|---|
| CA | 2327998 A1 | 6/2001 |
| CA | 2638672 A1 | 2/2009 |

(Continued)

OTHER PUBLICATIONS

Sun Microsystems, Best Pratices for Sun StorEdge 6920 System (Nov. 2004).

(Continued)

*Primary Examiner* — Van H Oberly
(74) *Attorney, Agent, or Firm* — Knobbe, Martens, Olson & Bear, LLP

(57) ABSTRACT

Through use of a mediator, one can translate and efficiently store data. The mediator may link one or more hosts to one or more storage devices. Optionally, the mediator may convert data and decode data. Through the use of meditator, one can realize certain economies because fewer units within recording media will be used. Additionally, in some embodiments, the mediator will also allow increased protection against unauthorized access and additionally or alternatively allow for efficient backing-up of data.

19 Claims, 3 Drawing Sheets

(56) References Cited

U.S. PATENT DOCUMENTS

| | | |
|---|---|---|
| 5,168,171 A | 12/1992 | Tracewell |
| D341,866 S | 11/1993 | Ross |
| 5,300,930 A | 4/1994 | Burger |
| D353,182 S | 12/1994 | Rubin |
| D357,461 S | 4/1995 | Zaplatynsky et al. |
| D362,243 S | 9/1995 | Spechts et al. |
| D366,246 S | 1/1996 | Simek et al. |
| D372,909 S | 8/1996 | Naufel |
| D377,482 S | 1/1997 | Geck |
| D382,880 S | 8/1997 | Cienkus et al. |
| D391,938 S | 3/1998 | D'Agaro |
| D393,455 S | 4/1998 | D'Agaro et al. |
| 5,748,921 A | 5/1998 | Lambrecht et al. |
| 5,751,549 A | 5/1998 | Eberhardt et al. |
| 5,784,611 A | 7/1998 | Thantrakul |
| 5,785,799 A | 7/1998 | Culnane et al. |
| D396,690 S | 8/1998 | Fryers |
| D397,097 S | 8/1998 | McNally |
| 5,797,143 A | 8/1998 | Buxton |
| 5,818,877 A | 10/1998 | Tsai et al. |
| 5,867,180 A | 2/1999 | Katayama et al. |
| 5,872,530 A | 2/1999 | Domyo et al. |
| D407,079 S | 3/1999 | Wu |
| 5,878,240 A | 3/1999 | Tomko |
| 5,890,794 A | 4/1999 | Abtahi et al. |
| D409,171 S | 5/1999 | Wu |
| 5,923,860 A | 7/1999 | Olarig |
| D415,747 S | 10/1999 | Wu |
| D421,428 S | 3/2000 | Wu |
| D422,993 S | 4/2000 | Storti et al. |
| D423,479 S | 4/2000 | Alo et al. |
| 6,052,785 A | 4/2000 | Lin |
| 6,067,227 A | 5/2000 | Katsui et al. |
| D431,241 S | 9/2000 | Armstrong et al. |
| 6,182,601 B1 | 2/2001 | Baatz |
| D439,566 S | 3/2001 | Ohanian |
| 6,243,831 B1 | 6/2001 | Mustafa et al. |
| 6,275,173 B1 | 8/2001 | Wu |
| D447,484 S | 9/2001 | Reznikov et al. |
| 6,297,742 B1 | 10/2001 | Canada et al. |
| 6,297,753 B1 | 10/2001 | Hayami |
| 6,310,564 B1 | 10/2001 | Fujimoto |
| 6,326,781 B1 | 12/2001 | Kunde et al. |
| 6,373,695 B1 | 4/2002 | Cheng |
| 6,396,027 B1 | 5/2002 | Wu |
| 6,401,807 B1 | 6/2002 | Wyler et al. |
| D462,075 S | 8/2002 | Hillyard et al. |
| 6,430,351 B1 | 8/2002 | Takahashi et al. |
| 6,442,031 B1 | 8/2002 | Liu |
| 6,465,969 B1 | 10/2002 | Murasko et al. |
| 6,483,439 B1 | 11/2002 | Vukosic |
| 6,494,780 B1 | 12/2002 | Norbury, Jr. |
| D471,912 S | 3/2003 | Camarota et al. |
| 6,541,921 B1 | 4/2003 | Luciano, Jr. et al. |
| D475,061 S | 5/2003 | Huang |
| 6,560,599 B1 | 5/2003 | Boa et al. |
| 6,605,778 B2 | 8/2003 | Dorfler et al. |
| 6,614,369 B1 | 9/2003 | Widmer |
| 6,621,935 B1 | 9/2003 | Xin et al. |
| 6,626,557 B1 | 9/2003 | Taylor |
| 6,644,481 B2 | 11/2003 | Dean et al. |
| D483,374 S | 12/2003 | Hung |
| D483,378 S | 12/2003 | Mundt |
| 6,658,435 B1 | 12/2003 | McCall |
| 6,674,908 B1 | 1/2004 | Aronov |
| 6,683,545 B2 | 1/2004 | Strasser |
| D490,083 S | 5/2004 | Wu |
| 6,737,299 B1 | 5/2004 | Jiang |
| 6,785,133 B2 | 8/2004 | Barringer et al. |
| 6,785,815 B1 | 8/2004 | Serret-Avila et al. |
| 6,829,695 B1 | 12/2004 | Ross |
| 6,844,824 B2 | 1/2005 | Vukosic |
| D503,717 S | 4/2005 | Kawamura |
| 6,904,484 B1 | 6/2005 | Nelson |
| 6,905,228 B1 | 6/2005 | Takeyasu et al. |
| 6,926,972 B2 | 8/2005 | Jakobi et al. |
| 6,956,745 B2 | 10/2005 | Kerrigan et al. |
| D513,751 S | 1/2006 | Alo et al. |
| 6,999,319 B2 | 2/2006 | Wu et al. |
| 7,030,837 B1 | 4/2006 | Vong et al. |
| 7,064,265 B2 | 6/2006 | Cochrane |
| 7,111,961 B2 | 9/2006 | Trenchard et al. |
| D529,915 S | 10/2006 | Scicluna et al. |
| D530,052 S | 10/2006 | Berti |
| D530,343 S | 10/2006 | Maruyama et al. |
| D530,704 S | 10/2006 | Cortes |
| 7,145,776 B2 | 12/2006 | King, Jr. et al. |
| D535,298 S | 1/2007 | Cochrane |
| 7,174,436 B1 | 2/2007 | Langendorf et al. |
| 7,231,560 B2 | 6/2007 | Lai et al. |
| 7,246,037 B2 | 7/2007 | Evans |
| 7,290,116 B1 | 10/2007 | Grohoski et al. |
| D555,159 S | 11/2007 | Cox et al. |
| D556,204 S | 11/2007 | Tosh et al. |
| 7,298,535 B2 | 11/2007 | Kuutti |
| D565,573 S | 4/2008 | Alo |
| 7,356,679 B1 | 4/2008 | Le et al. |
| 7,357,530 B2 | 4/2008 | Wang et al. |
| 7,363,331 B2 | 4/2008 | Karasudani et al. |
| D570,851 S | 6/2008 | Gundogan et al. |
| 7,371,975 B2 | 6/2008 | Oettinger et al. |
| D579,455 S | 10/2008 | Chu |
| 7,463,163 B2 | 12/2008 | Wu |
| 7,464,581 B2 | 12/2008 | Moriya et al. |
| 7,485,510 B2 | 2/2009 | Zhu et al. |
| 7,492,607 B2 | 2/2009 | Nguyen et al. |
| D590,831 S | 4/2009 | Evans |
| 7,515,413 B1 | 4/2009 | Curtis |
| 7,516,272 B2 | 4/2009 | Felton et al. |
| 7,539,026 B2 | 5/2009 | Finnerty et al. |
| D593,565 S | 6/2009 | Dearborn et al. |
| 7,587,408 B2 | 9/2009 | Snapp et al. |
| 7,620,784 B2 | 11/2009 | Panabaker |
| D609,236 S | 2/2010 | Matsumoto et al. |
| 7,726,837 B2 | 6/2010 | Ewert |
| 7,731,180 B2 | 6/2010 | Ohnishi |
| D619,108 S | 7/2010 | Lin |
| 7,794,124 B2 | 9/2010 | Hulsey et al. |
| 7,822,946 B2 | 10/2010 | Sharma |
| D631,480 S | 1/2011 | Vaughan |
| D631,630 S | 1/2011 | Berti |
| 7,921,088 B1 | 4/2011 | Mittal |
| 7,925,389 B2 | 4/2011 | Bradicich et al. |
| 7,930,473 B2 | 4/2011 | Rajan |
| D643,434 S | 8/2011 | Grady, IV et al. |
| 7,991,941 B2 | 8/2011 | Fortin |
| 7,996,361 B1 | 8/2011 | Shah et al. |
| 8,001,079 B2 | 8/2011 | Lu et al. |
| 8,006,108 B2 | 8/2011 | Brey et al. |
| 8,009,069 B2 | 8/2011 | Chen |
| D646,954 S | 10/2011 | Azelton et al. |
| 8,078,789 B2 | 12/2011 | Hinrichs |
| 8,117,028 B2 | 2/2012 | Murashima |
| D656,250 S | 3/2012 | Forster et al. |
| D656,502 S | 3/2012 | Cacioppo et al. |
| 8,129,742 B2 | 3/2012 | Lin et al. |
| 8,139,945 B1 | 3/2012 | Amir et al. |
| 8,164,490 B2 | 4/2012 | Itani |
| D659,136 S | 5/2012 | Matsumoto |
| D659,137 S | 5/2012 | Matsumoto |
| D659,653 S | 5/2012 | Lin |
| D661,696 S | 6/2012 | Takada |
| D662,501 S | 6/2012 | Lohman |
| D662,504 S | 6/2012 | Lohman |
| 8,200,923 B1 | 6/2012 | Healey et al. |
| D663,299 S | 7/2012 | Corke et al. |
| 8,214,425 B2 | 7/2012 | Provencal |
| 8,229,898 B1 | 7/2012 | Pype |
| 8,237,594 B2 | 8/2012 | Suzuki et al. |
| 8,238,091 B2 | 8/2012 | Chang et al. |
| 8,238,840 B2 | 8/2012 | Lio et al. |
| 8,265,323 B2 | 9/2012 | Stiehl et al. |
| 8,290,160 B1 | 10/2012 | Steeger |
| 8,310,830 B2 | 11/2012 | Zheng et al. |

(56) References Cited

U.S. PATENT DOCUMENTS

| | | |
|---|---|---|
| 8,314,555 B2 | 11/2012 | Huang et al. |
| 8,322,040 B2 | 12/2012 | Jimenez |
| 8,334,838 B2 | 12/2012 | Sadahiro et al. |
| D676,039 S | 2/2013 | Wallace et al. |
| D676,852 S | 2/2013 | Lohman |
| 8,366,464 B1 | 2/2013 | Figuerado et al. |
| D678,273 S | 3/2013 | Kuehn et al. |
| D681,635 S | 5/2013 | Wang |
| D682,267 S | 5/2013 | Mase |
| 8,470,388 B1 | 6/2013 | Zsinko et al. |
| D685,373 S | 7/2013 | Santos et al. |
| 8,474,994 B2 | 7/2013 | Campman |
| 8,508,928 B2 | 8/2013 | Killen et al. |
| 8,547,825 B2 | 10/2013 | Armstrong et al. |
| 8,560,501 B2 | 10/2013 | Deetz |
| 8,566,288 B1 | 10/2013 | Deetz |
| 8,570,738 B2 | 10/2013 | Fan et al. |
| D694,240 S | 11/2013 | Cho |
| 8,583,194 B2 | 11/2013 | Lio et al. |
| 8,589,643 B2 | 11/2013 | Meyer et al. |
| D694,758 S | 12/2013 | Muller |
| 8,601,201 B2 | 12/2013 | Scannell et al. |
| 8,639,849 B2 | 1/2014 | Achler |
| D699,212 S | 2/2014 | Tanaka |
| D702,650 S | 4/2014 | Reed et al. |
| 8,704,771 B2 | 4/2014 | Shigeta |
| D705,836 S | 5/2014 | Huschka |
| 8,715,127 B2 | 5/2014 | Beutler et al. |
| 8,717,764 B2 | 5/2014 | Sun |
| D706,780 S | 6/2014 | Abdollahi et al. |
| 8,782,463 B1 | 7/2014 | Singh |
| 8,793,684 B2 | 7/2014 | Breitgand et al. |
| D711,382 S | 8/2014 | Eriksen |
| 8,832,352 B2 | 9/2014 | Tsirkin et al. |
| 8,839,112 B2 | 9/2014 | Neerudu et al. |
| 8,868,860 B2 | 10/2014 | Beeken |
| D719,128 S | 12/2014 | Teulie |
| D719,571 S | 12/2014 | Sugilhara et al. |
| D720,353 S | 12/2014 | Nakamura |
| D720,357 S | 12/2014 | Kwon et al. |
| 8,930,647 B1 | 1/2015 | Smith |
| 8,938,643 B1 | 1/2015 | Karmarkar et al. |
| D722,060 S | 2/2015 | Kwon et al. |
| D722,995 S | 2/2015 | Moreau |
| 8,954,645 B2 | 2/2015 | North et al. |
| 8,964,385 B2 | 2/2015 | Lam et al. |
| D723,554 S | 3/2015 | Choo et al. |
| D723,555 S | 3/2015 | Choo et al. |
| 8,988,821 B2 | 3/2015 | Li |
| D726,180 S | 4/2015 | Roat et al. |
| 9,003,144 B1 | 4/2015 | Hayes et al. |
| D729,242 S | 5/2015 | Kim et al. |
| D729,809 S | 5/2015 | Akana et al. |
| D730,307 S | 5/2015 | Tang et al. |
| 9,035,786 B2 | 5/2015 | Clifford et al. |
| D731,010 S | 6/2015 | Levitt et al. |
| D731,484 S | 6/2015 | Olsson et al. |
| D733,137 S | 6/2015 | Kawai |
| D734,754 S | 7/2015 | Ficacci |
| D735,726 S | 8/2015 | Chen |
| 9,106,020 B2 | 8/2015 | Cohen et al. |
| D740,817 S | 10/2015 | Ignomirello |
| D740,818 S | 10/2015 | Ignomirello |
| D741,333 S | 10/2015 | Aoyagi et al. |
| 9,170,831 B2 | 10/2015 | Robinson et al. |
| D742,876 S | 11/2015 | Ignomirello |
| D742,883 S | 11/2015 | Akana et al. |
| D742,887 S | 11/2015 | Ignomirello |
| D743,404 S | 11/2015 | Ignomirello |
| 9,183,158 B2 | 11/2015 | O'Loughlin et al. |
| 9,304,703 B1 | 4/2016 | Ignomirello |
| 9,389,937 B2 | 7/2016 | Ackaret et al. |
| D768,135 S | 10/2016 | Ignomirello |
| D768,136 S | 10/2016 | Ignomirello |
| 9,467,294 B2 | 10/2016 | Ignomirello |
| 9,584,312 B2 | 2/2017 | Ignomirello |
| 9,603,251 B1 | 3/2017 | Ignomirello |
| 9,628,108 B2 | 4/2017 | Ignomirello |
| D786,258 S | 5/2017 | Ignomirello |
| 2002/0122597 A1 | 9/2002 | Kikuchi et al. |
| 2002/0172203 A1 | 11/2002 | Ji et al. |
| 2003/0018759 A1 | 1/2003 | Baumann |
| 2003/0115447 A1 | 6/2003 | Pham |
| 2003/0122694 A1 | 7/2003 | Green |
| 2004/0017651 A1 | 1/2004 | Gan et al. |
| 2004/0143733 A1 | 7/2004 | Ophir |
| 2004/0262409 A1 | 12/2004 | Crippen et al. |
| 2005/0091440 A1 | 4/2005 | Isa et al. |
| 2005/0099319 A1 | 5/2005 | Hutchison et al. |
| 2005/0191520 A1 | 9/2005 | Guntermann et al. |
| 2005/0198076 A1 | 9/2005 | Stata et al. |
| 2005/0210314 A1 | 9/2005 | Iguchi |
| 2005/0288800 A1 | 12/2005 | Smith et al. |
| 2006/0006517 A1 | 1/2006 | Lee et al. |
| 2006/0049956 A1 | 3/2006 | Taylor et al. |
| 2006/0171050 A1* | 8/2006 | Hanson .............. G11B 5/59627 360/48 |
| 2006/0174140 A1 | 8/2006 | Harris et al. |
| 2006/0212644 A1 | 9/2006 | Acton et al. |
| 2006/0212692 A1* | 9/2006 | Ueno ................. G06F 11/1417 713/1 |
| 2006/0248273 A1 | 11/2006 | Jernigan, IV |
| 2006/0256866 A1 | 11/2006 | Ziauddin et al. |
| 2006/0285287 A1 | 12/2006 | Chen et al. |
| 2007/0081320 A1 | 4/2007 | Gilbert |
| 2007/0087586 A1 | 4/2007 | Karamooz |
| 2007/0101074 A1 | 5/2007 | Patterson |
| 2007/0164875 A1 | 7/2007 | Fredericks et al. |
| 2007/0180207 A1 | 8/2007 | Garfinkle |
| 2007/0206375 A1 | 9/2007 | Piepgras et al. |
| 2007/0236334 A1 | 10/2007 | Borovoy et al. |
| 2007/0291934 A1 | 12/2007 | Volkovs et al. |
| 2008/0005380 A1 | 1/2008 | Kawasaki et al. |
| 2008/0054845 A1 | 3/2008 | Wang |
| 2008/0059702 A1 | 3/2008 | Lu et al. |
| 2008/0062020 A1 | 3/2008 | Lakus-Becker |
| 2008/0077586 A1 | 3/2008 | Lam |
| 2008/0133835 A1 | 6/2008 | Zhu et al. |
| 2008/0291664 A1 | 11/2008 | Pesenti |
| 2008/0307128 A1 | 12/2008 | Amron |
| 2008/0310628 A1 | 12/2008 | Fujioka |
| 2009/0006640 A1 | 1/2009 | Brouwer |
| 2009/0040032 A1 | 2/2009 | Gerber |
| 2009/0055593 A1 | 2/2009 | Satoyama et al. |
| 2009/0061756 A1 | 3/2009 | Germagian |
| 2009/0100236 A1 | 4/2009 | Puig |
| 2009/0112880 A1* | 4/2009 | Oliveira .............. H04L 67/1097 |
| 2009/0115646 A1* | 5/2009 | Duxbury ................. H03M 7/30 341/65 |
| 2009/0119468 A1 | 5/2009 | Taylor et al. |
| 2009/0129691 A1 | 5/2009 | Luttmer et al. |
| 2009/0141435 A1 | 6/2009 | Kreiner et al. |
| 2009/0169001 A1* | 7/2009 | Tighe ....................... H04L 9/34 380/217 |
| 2009/0193161 A1 | 7/2009 | Yoshida |
| 2009/0208221 A1 | 8/2009 | Sasai |
| 2009/0231153 A1 | 9/2009 | Hauenstein et al. |
| 2009/0300301 A1* | 12/2009 | Vaghani ................. G06F 3/061 711/162 |
| 2009/0303709 A1 | 12/2009 | Weatherley |
| 2009/0307251 A1 | 12/2009 | Heller et al. |
| 2010/0076527 A1 | 3/2010 | Hammond et al. |
| 2010/0162039 A1 | 6/2010 | Goroff et al. |
| 2010/0169287 A1 | 7/2010 | Klose |
| 2010/0211737 A1 | 8/2010 | Flynn et al. |
| 2010/0245665 A1 | 9/2010 | Chrnega et al. |
| 2010/0250501 A1 | 9/2010 | Mandagere et al. |
| 2010/0253617 A1 | 10/2010 | Lio et al. |
| 2010/0306294 A1 | 12/2010 | Schneider |
| 2011/0035361 A1 | 2/2011 | Soga |
| 2011/0107112 A1 | 5/2011 | Resch |
| 2011/0137519 A1 | 6/2011 | Christie |
| 2011/0170872 A1 | 7/2011 | Shin et al. |
| 2011/0276771 A1 | 11/2011 | Tajima et al. |

(56) References Cited

U.S. PATENT DOCUMENTS

| | | |
|---|---|---|
| 2011/0289294 A1 | 11/2011 | Maeda et al. |
| 2012/0076298 A1 | 3/2012 | Bolotov et al. |
| 2012/0124282 A1 | 5/2012 | Frank et al. |
| 2012/0131293 A1 | 5/2012 | Benhase et al. |
| 2012/0159282 A1 | 6/2012 | Ito |
| 2012/0166448 A1 | 6/2012 | Jin et al. |
| 2012/0166757 A1 | 6/2012 | Volkovs et al. |
| 2012/0191982 A1 | 7/2012 | Levin |
| 2012/0209448 A1 | 8/2012 | Brower |
| 2012/0209559 A1 | 8/2012 | Brower |
| 2012/0239860 A1 | 9/2012 | Atkisson et al. |
| 2012/0246472 A1 | 9/2012 | Berengoltz |
| 2012/0278382 A1 | 11/2012 | Faith |
| 2012/0278553 A1 | 11/2012 | Mudhiganti et al. |
| 2012/0285738 A1 | 11/2012 | Cochrane et al. |
| 2012/0303359 A1 | 11/2012 | Mizuguchi et al. |
| 2012/0330894 A1 | 12/2012 | Slik |
| 2013/0013618 A1 | 1/2013 | Heller et al. |
| 2013/0019076 A1 | 1/2013 | Amidi et al. |
| 2013/0106297 A1 | 5/2013 | Yeh |
| 2013/0111166 A1 | 5/2013 | Resch et al. |
| 2013/0211608 A1 | 8/2013 | Farrell et al. |
| 2013/0212161 A1 | 8/2013 | Ben-Shaul et al. |
| 2013/0268812 A1 | 10/2013 | Liu et al. |
| 2013/0283038 A1 | 10/2013 | Kulkarni et al. |
| 2014/0062307 A1 | 3/2014 | Spencer et al. |
| 2014/0082324 A1 | 3/2014 | Elhamias et al. |
| 2014/0119028 A1 | 5/2014 | Sato et al. |
| 2014/0146514 A1 | 5/2014 | Yahata |
| 2014/0211423 A1 | 7/2014 | Nguyen et al. |
| 2014/0223118 A1 | 8/2014 | Ignomirello |
| 2014/0223196 A1 | 8/2014 | Ignomirello |
| 2014/0258533 A1 | 9/2014 | Antony |
| 2014/0259014 A1 | 9/2014 | Watanabe et al. |
| 2014/0281257 A1 | 9/2014 | Hochberg et al. |
| 2014/0297938 A1 | 10/2014 | Puthiyedath et al. |
| 2014/0313043 A1 | 10/2014 | Heydron |
| 2014/0313700 A1 | 10/2014 | Connell et al. |
| 2014/0333449 A1 | 11/2014 | Thiesfeld et al. |
| 2015/0015405 A1 | 1/2015 | Bark et al. |
| 2015/0058543 A1 | 2/2015 | Chan et al. |
| 2015/0084270 A1 | 3/2015 | Lo et al. |
| 2015/0098205 A1 | 4/2015 | Keranen et al. |
| 2015/0117019 A1 | 4/2015 | Kuenzler et al. |
| 2015/0131965 A1 | 5/2015 | Yoshioka |
| 2015/0163060 A1 | 6/2015 | Tomlinson et al. |
| 2015/0211916 A1 | 7/2015 | McGinn et al. |
| 2015/0212263 A1 | 7/2015 | Tzeng |
| 2015/0324388 A1 | 11/2015 | Benke et al. |
| 2016/0011802 A1 | 1/2016 | Berke |
| 2016/0043484 A1 | 2/2016 | Brodsky et al. |
| 2016/0085022 A1 | 3/2016 | Yang et al. |
| 2016/0092203 A1 | 3/2016 | Filali-Adib et al. |
| 2016/0217047 A1 | 7/2016 | Ignormirello et al. |
| 2016/0218737 A1 | 7/2016 | Ignomirello |
| 2016/0232839 A1 | 8/2016 | Ignomirello |
| 2017/0026172 A1 | 1/2017 | Ignomirello |
| 2017/0220498 A1 | 8/2017 | Ignomirello |
| 2017/0221322 A1 | 8/2017 | Ignomirello |

FOREIGN PATENT DOCUMENTS

| | | |
|---|---|---|
| CN | 201426214 Y | 3/2010 |
| CN | 102611560 A | 7/2012 |
| CN | 203327301 U | 12/2013 |
| EP | 0403232 A2 | 12/1990 |
| EP | 2393009 A1 | 12/2011 |
| EP | 2897018 A1 | 7/2015 |
| GB | 2407427 A | 4/2005 |
| JP | H07-504541 A | 5/1995 |
| JP | 2000-31831 A | 1/2000 |
| JP | 2007-272826 | 10/2007 |
| JP | 2007-281763 A | 10/2007 |
| JP | 2008-107615 A | 5/2008 |
| JP | 2008-165293 | 7/2008 |
| JP | 2009-251725 | 10/2009 |
| JP | 2010-512057 A | 4/2010 |
| JP | 2010072740 | 4/2010 |
| JP | 2011-203842 | 10/2011 |
| JP | 2012-027587 | 2/2012 |
| JP | 2012-80470 A | 4/2012 |
| JP | 2012-129785 A | 7/2012 |
| WO | 2006/042019 A2 | 4/2006 |
| WO | WO 2006/042041 A2 | 4/2006 |
| WO | WO 2010/138824 A2 | 12/2010 |
| WO | WO 2012/117658 | 7/2012 |
| WO | WO 2014/121102 A2 | 8/2014 |
| WO | 2014/170617 A1 | 10/2014 |
| WO | WO 2015/039181 A1 | 3/2015 |

OTHER PUBLICATIONS

Seagate, SCSI Commands Reference Manual (Feb. 14, 2006).
Makatos, Thano, et al., ZBD: Using Transparent Compression at the Block Level to Increase Storage Space Efficiency, IEEE Computer Society pp. 61-70 (2010).
Tate, Jon, et al., Real-time Compression in SAN Volume Controller and the Storwize V 7000, IBM (Aug. 17, 2012).
International Search Report and Written Opinion dated Aug. 20, 2014 issued in connection with International Application No. PCT/US2014/014209, 5 pages.
International Search Report and Written Opinion dated Jan. 16, 2015 issued in connection with International Application No. PCT/US2014/014225, 2 pages.
Lillibridge, M., Eshghi, K., Bhagwat, D., Deolalikar, V., Trezise, G., and Camble, P. 2009. Sparse indexing: Large Scale, inline deduplication using sampling and locality. In Proceedings of the 7th USNIX Conference on File and Storage Technologies (FAST), USENIX Association, Berkeley, CA, 111-123, 13 pages.
International Preliminary Report on Patentability dated Aug. 13, 2015 in connection with International Application No. PCT/US2014/014209, 8 pages.
International Preliminary Report on Patentability dated Aug. 13, 2015 in connection with International Application No. PCT/US2014/014225, 7 pages.
Extended European Search Report dated Sep. 26, 2016 issued in connection with corresponding EP Application No. 14745756.8 (9 pages total).
Extended European Search Report dated Aug. 19, 2016 issued in connection with corresponding EP Application No. 14745861.6 (9 pages total)
Anonymous: "Huffman coding", Wikipedia, the free encyclopedia, Jan. 18, 2013 (Jan. 18, 2013), pp. 1-10, XP055303125, Retrieved from the Internet: https://en.wikipedia.org/w/index.phptitle=Huffmancoding&oldid=533661878 [retrieved on Sep. 15, 2016] (10 pages total).
Anonymous: "Zero suppression", Wikipedia, the free encyclopedia, Jul. 25, 2012 (Jul. 25, 2012), XP055303438, Retrieved from the Internet: https://en.wikipedia.org/w/index.php?title=Zero suppression &oldid=504088023 [retrieved on Sep. 16, 2016] (2 pages total).
Dictionary Techniques, C.M. Liu, National Chiao-Tung University Website, Dec. 31, 2010, website: http://people.cs.nctu.edu.tw/~cmliu/Courses/Compression/chap5.pdf, 137 pages.
Smith, "Data compression tutorial: Part 1," EE Times, Jun. 14, 2007.
Japanese Office Action dated Mar. 14, 2017, issued in connection corresponding JP Application No. 2016-080683 (9 pages total).
"CleanSync 2.0", CleanSync Team, retireved from http://www.top4download.com/cleansync/xfliyozl.html, dated Feb. 25, 2012, 3 pages.
"Disk Cloning and Mass System Deployment" retrieved from http://www.drive-image.com/Disk_Cloning_and_Mass_System_Deployment.shtml, 21 pages.
"Enabling Memory Reliability, Availability, and Serviceability Features on Dell PowerEdge Servers," http://citeseerxist.psu.edu/viewdoc/download?doi=10.1.1.692.4199&rep=rep1&type=pdf, Dell Power Solutions, Aug. 2015.

(56) References Cited

OTHER PUBLICATIONS

"IBM TotalStorage Enterprise Server Model 800", IBM, retrieved from http://ps-2.kev009.com/rs6000/manuals/SAN/ESS/ESS800_Product_Data_sheet.pdf, dated 2003, 6 pages.
"Lenovo Servers RAS Features," https://youtu.be/zZyDxnCUE4c, Jan. 11, 2016.
"Memory RAS technologies for HPE ProLiant/Synergy/Blade Gen10 servers with Intel Xeon scalable processors", retrieved from https://www.hpe.com/h20195/V2/GetPDF.aspx/4AA4-3490ENW.pdf, Hewlett Packard Enterprises, Oct. 2017, 9 pages.
"Ntfsclone—Efficiently clone, image, restore or rescue an NTFS", Ubuntu, retrieved from http://manpages.ubuntu.com/manpages/gutsy/man8/ntfsclone.8.html, 4 pages.
"Restore A System Image BackUp to Computer with Dissimilar Hardware", AOMEI, retrieved from http://www.backup-utility.com/features/dissimilar-hardware-restore.html, 5 pages.
"Revisiting Memory Errors in Large-Scale Production Data Centers: Analysis and Modeling of New Trends from the Field" by Justin Meza, Qiang Wu, Sanjeev Kumar, and Onur Mutlu, Carnegie Mellon University and Facebook, Inc., 2015 {Facebook fleet analysis over 14 months}.
Alibaba, "new arrival fashion design zinc alloy metal U shap handle for leather of bag accessories qifeng f-994", retrieved on Jul. 18, 2015 from http://alibaba.com/product-detail/new-arrival-fasion-design-zinc-alloy_1402892576.html?smToken=f4543babcb5440fda870ba4c2a621f1c&smSign=2q%Bp5jXRBjWkFnOu62%2Fy%2Fw%3D%3D, 1 page.
Aliexpress, "F238F 3.5" Hot-Swap SAS/SATA Hard Disk Drive Caddy/Tray", retrieved on Jul. 14, 2015 from http://www.aliexpress.com/store/product/F238F-3-5-Hot-Swap-SAS-SATA-Hard-Disk-Drive-Caddy-Tray/1129178_1677183967.html, 1 Page.
All Data Parts, "ICY DOCK ToughArmor MB992SK", retrieved on Jan. 29, 2016 from http://www.alldataparts.com/index.php?main_page=product_info&cPath=59_699_714&products_id=65914&zenid=c7a2e4f22f81deb6482a7df9318ad922, 2 pages.
American Standard Circuits, Inc., "High Temperature Organic Adhesive Bonding Films", retrieved from http:// www.asc-i.com/preview/technology/thermal-management/, on May 26, 2015, 5 pages.
Anonymous: "Find Seed from Random Numbers", Blitz Research Programming Forums, Dec. 4, 2011 (Dec. 4, 2011), XP055297586, retrieved from the Internet: http://web.archive.org/web/20111204053405/http://blitzbasic.com/Community/posts.php?topic=61025 (5 pages total).
Backblaze, "Backblaze Faceplates", Sep. 8, 2015, retrieved on Jan. 29, 2016 from hllps://www.backblaze.com/blog/the-next-backblaze-face-plate/, 9 pages.
CCLONLINE, "Cougar MX300 Gamer Case, ATX, No PSU, Max 7 Fans, 7 PCI Cards, USB 3.0, Honeycomb Front", retrieved on Jul. 14, 2015 from http://www.cclonline.com/product/167472/MX300/Cases/COUGAR-MX300-Gamer-Case-ATX-No-PSU-Max-7-Fans-7-PCI-Cards-USB-3-0-Honeycomb-Front/CAS1679/, 2 pages.
Chapter 15. "Cooling of Electronic Equipment", retrieved from http://highered.mheducation.com/sites/dl/free/0073398128/835451/Chapter15.pdf, 70 pages.
Checkline Europe, "ZT-DPU Digital Force Guage with luminescent display & remote sensor," retrieved on Jul. 17, 2015 from http://www.checkline-eurpe.co.uk/digital_force_gauges1/ZT-DPU, 6 pages.
Chung et al., "Low Tg Epoxy Adhesives for Thermal Management", retrieved from www.aitechnology.com/uploads/pdf/WHITE%20PAPER/lowTgEpoxy.pdf, 14 pages.
Cisco, "10 Gigabit Ethernet Switching for High-Performance, Rack-Optimized Server Switiching", retrived on Jul. 18, 2015 from http://www.cisco.com/c/en/us/products/collateral/switches/catalyst-4900-series-switches/product_data_sheet0900aecd80246552.html, 14 pages.
Cisco, "Cisco Catalyst 4948 10 Gigabit Ethernet Switch Data Sheet", retrieved on Jul. 20, 2015 from http://www.cisco.com/c/en/us/products/collateral/switches/catalyst-4900-series/product_data_sheet0900aecd80246552.html, 14 pages.

Cisco, "Cisco HDT Network Storage Hard Drive Trays Cisco Small Business Network Storage Systems", retrieved on Jul. 20, 2015 from http://www.cisco.com/c/en/us/products/collateral/storage-networking/hdt-network-storage-hard-drive-trays/data_sheet_c78-502733.pdf, 3 pages.
Cisco, "Replacing Cisco ASR 9000 Series Router Components", retrieved on Jan. 29, 2016 from http://www.cisco.com/c/en/us/td/docs/routers/asr9000/hardware/installation/guide/asr9kHIGbk/asr9klGmaintaining.html, 15 pages.
Cisco, "Replacing the Cisco 3745 Faceplate/Fan Tray", manual, retrieved on Jul. 14, 2015 from http://www.cisco.com/public/scc/compass/3700/tasks-task_3745_faceplate_replace.htm, 1 Page.
Colo Advisor, "High Density Colocation—Planning Pays Off", retrieved on Jul. 18, 2015 from http://www.coloadvisor.com/blog/high-density-colocation-planning-pays-off/, 5 Pages.
D. Tang et al., "Assessment of the Effect of Memory Page Retirement on System RAS Against Hardware Faults," DSN, 2006.
Delcom Products, "USB Visual Signal Indicator RGB", retrieved on Apr. 4, 2016 from https://www.delcomproducts.com/productdetails.asp?prodcutnum=804000, 2 pages.
Dell, "Hard Disk Drive Caddy or Tray", retrieved on Jan. 29, 2016 from http://www.aliexpress.com/store/producl/F238F-3-5-Hot-Swap-SAS-SATA-Hard-Disk-Drive-Caddy-Tray/1129178_1677183967.html, 4 Pages.
Dell, "Installing Enclosure Components", retrieved on Jul. 18, 2015 from http://ftp.respmech.com/pub/MD3000/en/ MD3000_0wners_Manual/install.htm, 11 Pages.
Dhgate, 120mm Apexi 3 in 1 Guage hu's Store Dhgate, retrieved on Jul. 17, 2015 from http://webcache.googleusercontent.com/search?q=cache:YpQK9gy7APQJ:www.dhgate.com/store/product/120mm-apexi-3-in-1-guage-tachometer-rpm-water/141993290.html+&cd=6&hl=en&ct=clnk&gl=in, 3 pages.
DRAM errors in the wild: a large-scale field study, Bianca Schroeder, Eduardo Pinheiro, Wolf-Dietrich Weber, SIGMETRICS/Performance'09, Jun. 15-19, 2009, Seattle, WA, USA {largescale Google study for 2.5 years}.
Ebay, "Dell PowerEdge M610 Server 2XQUAD Core 2.8GHz/X5560 64GB 2X300GB Raid Rails", retrieved on Jul. 18, 2015 from http://www.ebay.ca/itm/271899179228?rmvSB=true, 3 pages.
Ebay, "Vintage VGC CHROME Chevron Boomerang DRAWER Cabinet Door Pulls Washington", retrieved on Jul. 18, 2015 from http://www.ebay.com/itmNintage-VGC-CHROME-Chevron-Boomerang-DRAWER-Cabinet-Door-Pulls-Washington/200818869564?trksid=p204_7675.c100005.m_1851&_trkparms=aid%3D222007%26algo%3DSIC.MBE%_D26ao%3D1%26asc%3D32298%26meid%3D3280c5c9af794a00afd5a_1_a69fc33f59%26pid%3D, 1 Page.
Edwards Signaling, "125XBRi Series XTRA-BRITE", Data Sheet ES001-0114, No. 1, retrieved on Apr. 4, 2016 from https://edwards-signals.com/files/125XBRI_Series_datasheet_v10.pdf, 2 pages.
European Search Report dated Sep. 5, 2016 in connection with corresponding EP Patent Application No. 16165443.9 (9 pages total).
EZ-PC, "Infrastructure and Networking", retrieved on Jul. 18, 2015 from http://www.ez-pc.org/services/infrastruture, 3 pages.
Frostytech, "Copper Honeycomb Concept Heatsink—BBHS Thermal Solutions Corp", retrieved on Jul. 14, 2015 from http://www.frostytech.com/permalinkArch.cfm?NewsID=88219, 1 Page.
Gilbert, "The Bus (PCI and PCI-Express)", retrieved from hppt://www.yale.edu/pclt/PCHW/BUS.HTM on Apr. 28, 2015 dated Jan. 4, 2008, 5 pages.
Hague Registration No. DM/056877, retrieved on Jul. 18, 2015 from http://www.wipo.int/designdb/hague/en/showData.jsp?SOURCE=Hague&Key=DM056877, 3 page.
Hardware Secrets, "Everything You Need to Know About the PCI Express", retrieved from http://www.hardwaresecrets.com/article/EverythingYouNeedtoKnowAboutthePCIExpress/190 on Jul. 12, 2012, 3 pages.
Hewlett Packard (HP), "Best Practices for HP BladeSystem Deployments using HP Serviceguard Solutions for HP-UX 11i", HP Publication No. 5697-0470, May 2010, pp. 1-26.

(56) References Cited

OTHER PUBLICATIONS

Highly Relable Systems, "RAIDFrame DAS 5000", retrieved on Jul. 18, 2015 from https://www.high-rely.com/products/raidframe5bay/ 1 page.
Highly Reliable Systems, "MPac-G2 Media Tray", retrieved on Jan. 29, 2016 from https:/lwww.high-rely.com/products/mpac-media/, 1 page.
Highly Reliable Systems, "RAID Frame 5 Bay", retrieved on Jan. 29, 2016 from https:/lwww.high-rely.com/products/raidframe5bay/, 1 page.
IDOTPC, "BR-0804 4pc/set Rackmount Half-1 U Joint Plate Kit", retrieved on Jul. 18, 2015 from http://www.idotpc.com, thestore/pc/BR-0804-4pc-set-Rackmount-Half-1U-Joint-Plate-Kit-p1343.htm, 1 Page.
Intel, "Intel 64 and IA-32 Architectures Optimization Reference Manual", Manual, Sep. 2014, 642.
International Computer Concepts Inc, "PCI & PCIe Overview/Comparision", retrieved from http://www.iccusa.com/comparepci/ on Apr. 28, 2015, 5 pages.
International Search Report and Written Opinion dated Apr. 14, 2017, issued in connection with corresponding International Application No. PCT/US2017/015544 (13 pages total).
International Search Report for International Application No. PCT/US17/24692 dated Jul. 27, 2017.
Japanese Office Action dated Sep. 20, 2016, issued in connection with corresponding Japanese Patent Application No. 2016-080683 with English Language translation (8 pages total).
Koike et al. Analyse validity of dedup technology, Information Processing Association Reports, 2011, 6, "DVD-ROM", Japan, General Legal Entity, Information Processing Society, May 1, 2012, vol. 2012-EVA-37, No. 1, pp. 1 to 6.
Mactech, "NES Cartridge External Hard Drive", retrieved on Jul. 18, 2015 from http://www.mactech.com/category/ type-article/macmod-web-site/miscellaneous-mods, 2 Pages.
McCabe, "How to Add a Hard Drive to Your Windows Home Server", Information Week Network Computing, retrieved on Jul. 14, 2015 from http://www.networkcomputing.com/storage/how-to-add-a-hard-drive-to-your-windows-home-server-/d/d-id/1098397?, 3 Pages.
Oracle Corp, "I/O Domains and PCI Express Buses", retrieved from docs.oracle.com/cd/E19604 01/8210406/configurepciexpressbusesacrossmultipledoms/index.html on Apr. 28, 2015, 3 pages.
Philips, "Philips AZ302/98 CD Sound Machine", retrieved on Feb. 5, 2016 from http://www.naaptol.com/portable-speakers/philips-az302/p/641367.html, 3 pages.
Saduqulla et al., "Threshold Proxy Re-Encryption in Cloud Storage System", International Journal of Advanced Research in Computer Science and Software Engineering, vol. 3, Issue 11, retrieved from http://www.ijarcsse.com/docs/papers/Volume_3/11_November2013/V3/11-0332.pdf, dated Nov. 2013, 5 pages.
Samsung Memory DDR4 SDRAM, http://www.samsung.com/us/dell/pdfs/DDR4_Brochure_2015.pdf, Samsung Electronic Co., 2 pages, 2015.
Startech, "Hot Swap Hard Drive Tray for SATSASBAY3BK", retrieved on Feb. 1, 2016 from http://www.startech.com/HDD/Mobile-Racks/Extra-25inch-or-35inch-Hot-Swap-Hard-Drive-Tray-for-SATSASBAY3BK~SATSASTRAYBK, 3 pages.
Symbolic IO Corporation, International Search Report and Written Opinion dated May 3, 2016, for PCT/US16/25988, 8 pages.
Weil, Sage A., CRUSH: Controlled, Scalable, Decentralized Placement of Replicated Data; IEEE—2006; p. 1-12.
Wylie et al., "Selecting the right data distribution scheme for a survivable storage system", CMU-CS-01-120, Carnegie Mellon University, retrieved from http://www.pdl.cmu.edu/PDL-FTP/Storage/CMU-CS-01-120.pdf, dated May 2001, 23 pages.
Xilinx, Inc., Virtex-5 Family Overview, Feb. 6, 2009, 13 pages.
"Elastic Online Analytical Processing on RAMCloud4," Tinnefeld et al., EDBT/ICDT (Mar. 18-22, 2013), available at https://openproceedings.org/2013/conf/edbt/TinnefeldKGBRSP13.pdf.
"RamCloud Project", accessed Apr. 3, 2018, available at https://ramcloud.atlassian.net/wiki/spaces/RAM/overview.
"Breakthrough Nonvalatile Memory Technology," Micron, 3D Xpoint Technology, accessed Apr. 3, 2018, available at https://www.micron.com/products/advanced-solutions/3d-xpoint-technology.

\* cited by examiner

DATA STORAGE AND RETRIEVAL MEDIATION SYSTEM AND METHODS FOR USING SAME

FIELD OF THE INVENTION

The present invention relates to the field of data storage.

BACKGROUND OF THE INVENTION

The twenty-first century has witnessed an exponential growth in the amount of digitized information that people and companies generate and store. This information is composed of electronic data that is typically stored on magnetic surfaces such as disks, which contain small regions that are sub-micrometer in size and are capable of storing individual binary pieces of information.

Because of the large amount of data that many entities generate, the data storage industry has turned to network-based storage systems. These types of storage systems may include at least one storage server that forms or is part of a processing system that is configured to store and to retrieve data on behalf of one or more entities. The data may be stored and retrieved as storage objects, such as blocks and/or files.

One system that is used for storage is a Network Attached Storage (NAS) system. In the context of NAS, a storage server operates on behalf of one or more clients to store and to manage file-level access to data. The files may be stored in a storage system that includes one or more arrays of mass storage devices, such as magnetic or optical disks or tapes. Additionally, this data storage scheme may employ Redundant Array of Independent Disks (RAID) technology.

Another system that is used for storage is a Storage Area Network (SAN). In a SAN system, typically a storage server provides clients with block-level access to stored data, rather than file-level access to it. However, some storage servers are capable of providing clients with both file-level access and block-level access.

Regardless of whether one uses NAS or SAN, the storage of electronic data presents two primary challenges: (1) how to protect against loss of data; and (2) how to reduce the costs of storing data. Unfortunately, these two challenges push a person in desire of storing data in different directions.

Historically, in order to protect against a loss of data, persons made wholesale back-up copies of their files. However, this proved to be cumbersome. In order to render the process of storing and backing-up data more efficient, RAID technologies were developed. Unfortunately, these technologies typically provide localized data protection that primarily protects against corruption of data, not destruction of recording media. Thus, depending on the extent of physical harm that may befall the physical environment of a recording medium, the use of RAID technologies may or may not be effective because the same physical harm may befall the back-up copy or copies.

Additionally or alternatively, one can make use of data replication technology that calls for the transmission of digital information over a network to a remote site. However, there is a physical distance constraint that is a function of the distance between sites and that limits the effectiveness of this strategy. For example, limitations are imposed by the speed of light, the rate of data ingestion, and the rate of daily data change. Moreover, there are economic costs associated with making an additional copy and storing an additional copy of data, and there is a devotion of time that is necessary when one makes copies. Still further, there is always a desire to introduce protection against improper access to data.

Therefore, there is a need for new methods and systems for economically storing and retrieving data.

SUMMARY OF THE INVENTION

The present invention provides methods, systems, computer program products and technologies for improving the efficiency of storing and retrieving data. By using a mediator as per various embodiments of the present invention, one can efficiently store and access data that optionally has been converted. Because the present invention separates metadata from raw data, there is no limitation based on the type of file that can be used in connection with this invention. Additionally, through the various embodiments of the present invention one may transform data and/or change the physical devices on which the transformed or converted data is stored. This may be accomplished through automated processes that employ a computer that comprises or is operably coupled to a computer program product that when executed carries out one or more of the methods or processes of the present invention. These methods or processes may for example be embodied in or comprise, consist essentially of or consist of an algorithm or script.

The mediators of the present invention may serve one or more of the following purposes: (1) storing a protocol for encoding data; (2) allocating physical space on recording media; (3) acting as a central point for a host initiator's disk geometry; (4) adding security; (5) allowing system internals to log, to read, and to interact with one or two reserves ($R_1$ and $R_2$); (6) providing frameworks for new ways to take snapshots and/or to clone disks; and (7) to provide metadata. The realization of one or more if not all of these features can contribute to the efficiency of methods for storing data, protecting data from unauthorized access and/or retrieving data.

According to a first embodiment, the present invention is directed to a method for storing electronic data, said method comprising: (i) receiving a set of parameters, wherein the parameters comprise one or more of file system information, bootability information and partition information; (ii) receiving metadata; (iii) receiving one or more files, wherein each file has a file name; (iv) storing the parameters and metadata on a mediator; (v) storing each of the files on a non-cache medium at a location; and (vi) storing on the mediator, a correlation of each file name with a location on the non-cache medium.

According to a second embodiment, the present invention is directed to a method for backing up data, said method comprising: (i) on a first mediator, correlating a plurality of file names with a plurality of locations of data files, wherein the locations of the data files correspond to locations on a first non-cache medium and the first mediator is configured to permit a user who identifies a specific file name to retrieve a data file that corresponds to the specific file name; (ii) copying the plurality of data files to a second non-cache medium; (iii) generating a second mediator, wherein the second mediator is a copy of the first mediator at time T1 and within the second mediator the locations of a plurality of data files on the second non-cache medium are correlated with the file names; (iv) receiving instructions to save revisions to a data file; and (v) at time T2, which is after T1, in the first non-cache medium saving the revisions to the data file. Preferably, the revisions are not saved in the corresponding data file on the second non-cache medium.

According to a third embodiment, the present invention provides a data storage and retrieval system comprising: (i) a non-cache data storage medium; (ii) a mediator, wherein the mediator is stored remotely from the non-cache data storage medium, and the mediator comprises: (a) a first set of tracks; (b) a second set of tracks; (c) a third set of tracks; and (d) a fourth set of tracks; and (ii) a manager, wherein the manager is configured: (a) to store data comprising one or more of file system information, bootability information and partition information in the first set of tracks; (b) to store metadata in the third set of tracks; (c) to store one or more files on the non-cache medium, wherein the one or more files are stored on the non-cache medium without any of file system information, bootability information and partition information; (d) to store in the fourth set of tracks the location of each file in the non-cache medium; and (e) to store a correlation of the location of each file in the non-cache medium with a host name for a file.

Through the various embodiments of the present invention, one can increase the efficiency of storing and retrieving data. The increased efficiency may be realized by using less storage space than is used in commonly used methods and investing less time and effort in the activity of storing information. In some embodiments, one can also increase protection against unauthorized retrieval of data files. These benefits may be realized when storing data either remotely or locally, and the various embodiments of the present invention may be used in conjunction with or independent of RAID technologies.

DETAILED DESCRIPTION OF THE INVENTION

Figure 1:
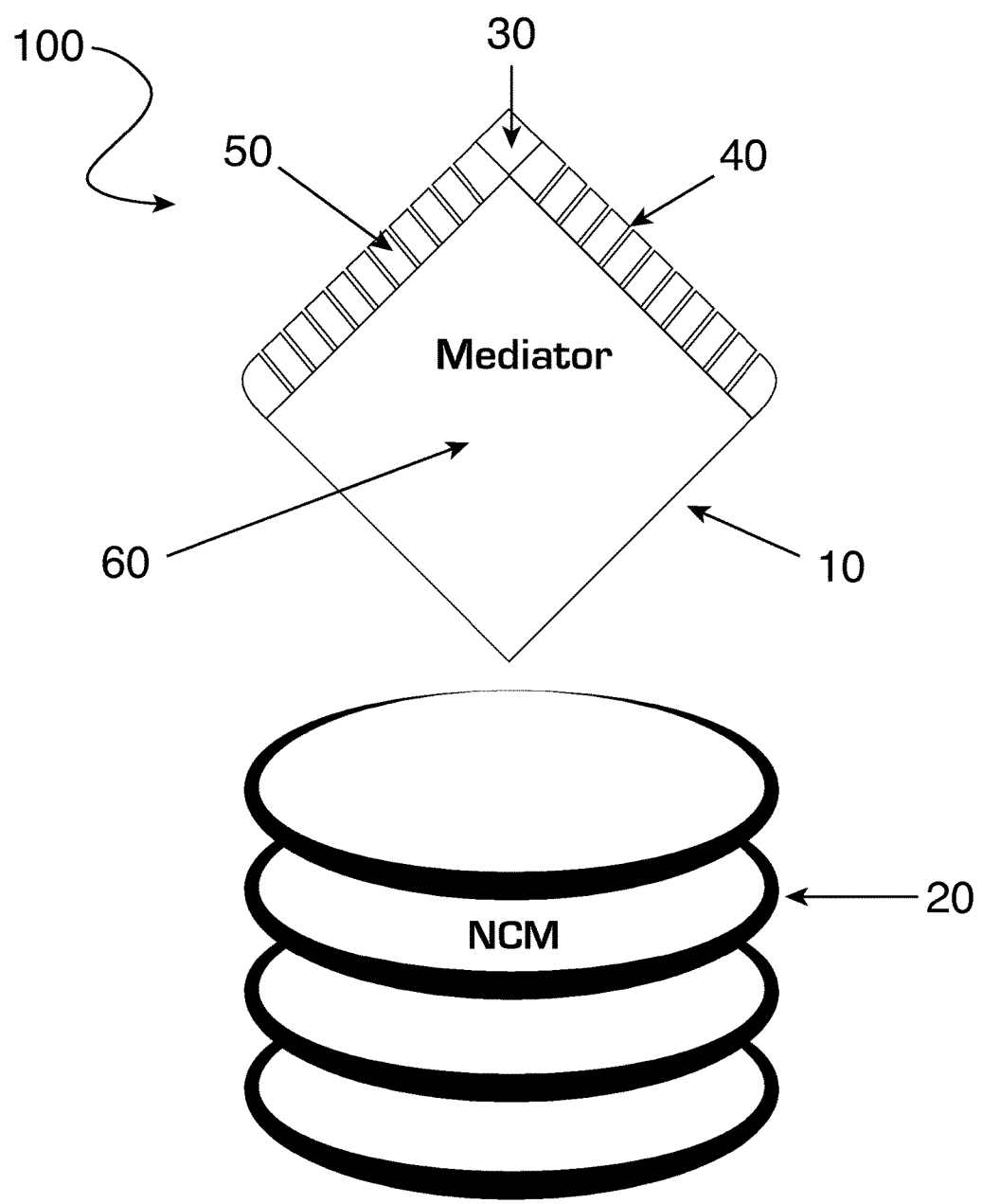
FIG. 1 is a representation of a mediator and non-cache medium (NCM).

Reference will now be made in detail to various embodiments of the present invention, examples of which are illustrated in the accompanying figures. In the following detailed description, numerous specific details are set forth in order to provide a thorough understanding of the present invention. However, unless otherwise indicated or implicit from context, the details are intended to be examples and should not be deemed to limit the scope of the invention in any way.

Definitions

Unless otherwise stated or implicit from context the following terms and phrases have the meanings provided below.

The term "bit" refers to a binary digit. It can have one of two values, which can be represented by either 0 or 1. A bit is the smallest unit that is stored on a recording medium.

The term "block" refers to a sequence of bytes or bits of data having a predetermined length.

The phrases "bootability code," "bootability information" and "bootability feature" refer to information that provides the means by which to enter a bootable state and may be stored on a boot sector. A boot sector may contain machine code that is configured to be loaded into RAM (random access memory) by firmware, which in turn allows the boot process to load a program from or onto a storage device. By way of example, a master boot record may contain code that locates an active partition and invokes a volume boot record, which may contain code to load and to invoke an operating system or other standalone program.

The term "byte" refers to the sequence of eight bits.

The term "cache" refers to the location in which data is temporarily stored in order for future requests for the data to be served faster or for the purposes of buffering. The L1 cache (level 1 cache) refers to a static memory that is, for example, integrated with a processor core. The L1 cache may be used to improve data access speed in cases in which the CPU (central processing unit) accesses the same data multiple times. The L2 cache is typically larger than the L1 cache, and if a data file is sought but not found in a L1 cache, a search may be made of a L2 cache prior to looking to external memory. In some embodiments, the L1 cache is not within a central processing unit. Instead, it may be located within a DDR, DIMM or DRAM. Additionally or alternatively, L2 cache may be part of PCI2.0/3.0, which goes into a motherboard. Thus, each of L1 cache and L2 cache may be in separate parts of a motherboard. With respect to size, in some embodiments of the present invention L1 cache is between 2 gigabytes and 128 terabytes or between 2 gigabytes and 4 terabytes; and L2 cache is between 16 gigabytes and 1 petabyte or between 16 gigabytes and 3.2 terabytes.

The term "chunklet" refers to a set of bits that may correspond to a sector cluster. The size of chunklet is determined by the storage system and may have a size N. Traditionally, N was derived by the CHS scheme, which addressed blocks by means of a tuple that defines the cylinder, head and sector at which they appeared on hard disks. More recently, N has been derived from the LBA measurement, which refers to logical block addressing, and is another means for specifying the location of blocks of data that are stored on computer storage devices. By way of example, N may be 512 B, 1K, 2K, 4K, 8K, 16K, 32K, 64K or 1 MB. As persons of ordinary skill in the art are aware 1K=1024 B. Chunklets may be received as raw data from a host.

The term "cubelet" refers to a virtual portion of capacity of a storage medium. Thus, it is a three dimensional space within what may be a non-cache medium. Within a cubelet, binary data that corresponds to a file or to part of a file may be stored, and from the cubelet this data may be retrieved. Thus, a cubelet is a virtual measurement and is analogous to a LUN (logic unit number).

A "file" is a collection of related bytes or bits having an arbitrary length. A file may be smaller than a chunklet, the same size as a chunklet or larger than a chunklet.

The phrase "file name" refers to a notation or code that permits a computer to identify a specific file and to distinguish that file from other files.

The phrase "file system" refers to an abstraction that is used to store, to retrieve and to update a set of files. Thus, the file system is the tool that is used to manage access to the data and the metadata of files, as well as the available space on the storage devices that contain the data. Some file systems may for example reside on a server. Examples of file systems are the Unix file system and its associated directory tables and Modes, Windows FAT16 and FAT32 file systems (FAT refers to File Allocation Table), Window NTFS, which is based on master file tables, and Apple Mac OSX uses HFS or HFS plus.

The terms "host" and "initiator" may be used interchangeably and refer to the entity or system that sends data for storage to the data storage and retrieval mediation system of the present invention.

The phrase "operably coupled" means that systems, devices and/or modules are configured to communicate with each other or one another and are able to carry out their intended purposes when in communication or after having communicated.

The abbreviation "LBA" refer to logical block addressing. LBA is a linear addressing scheme and is a system that is used for specifying the location of blocks of data that are stored in certain storage media, e.g., hard disks. In a LBA scheme, blocks are located by integer numbers and only one number is used to address data. Typically, the first block is block 0.

The term "manager" refers to a computer program product, e.g., code that may be stored in a non-transitory medium and that causes one or more other actions to be taken, e.g., receiving, transmitting or processing data. It may be stored on hardware, software or a combination thereof. In some embodiments, the manager may be part of a computer and/or system that is configured to permit the manager to carry out its intended function.

The term "mediator" refers to a computer program product that may be stored on hardware, software or a combination thereof, and that correlates one or more units of storage space within at least one non-cache medium with a file name. In some embodiments, a mediator may be viewed as including a conversion engine. A mediator may be orders of magnitude smaller than the non-cache medium to which it points. For example, it may be approximately as small as about 0.2% of the size of a typical cylinder. In some embodiments, the mediator may exist in a computing cloud, whereas in other embodiments, it exists in a non-transitory tangible recording medium. The mediator may be able to organize, translate and control the storage of data in locations that hosts perceive as being in certain tracks of recording media while actually occurring in different tracks of recording media. Furthermore, the mediator may comprise a sector map, a table or other organization of data that may be located within a physical device or structure, and thus the contents of the mediator may cause the physical device or structure to have certain geometry.

The term "metadata" refers to the administration information about containers of data. Examples of metadata include but are not limited to the length or byte count of files that are being read; information pertaining to the last time files were modified; information that describes file types, and access permissions; cubelet QoS, VM and WORM. Other types of metadata include operating system information, auto-initialization information, group permissions, frequency of bits within the document type. In some embodiments, stored metadata may for example be used to permit efficient contraction or expansion of storage space for an initiator as the number and size of documents that it seeks to store shrinks or grows.

The abbreviation "NAS" refers to network area storage. In a NAS system, a disk array may be connected to a controller that gives access to a local area network transport.

The phrase "operating system" refers to the software that manages computer hardware resources. Examples of operating systems include but are not limited to Microsoft Windows, Linux, and Mac OS X.

The term "partition" refers to formats that divide a storage medium, e.g., a disc drive into units. Thus, the partition may also be referred to as a disk partition. Examples of partitions include but are not limited to a GUID partition table and an Apple partition map.

The abbreviation "RAID" refers to a redundant array of independent disks. To the relevant server, this group of disks may look like a single volume. RAID technologies improve performance by pulling a single strip of data from multiple disks and are built on one or multiple premise types such as: (1) mirroring of data; (2) striping data, or (3) a combination of mirroring and striping of data.

The phrase "recording medium" refers to a non-transitory tangible computer readable storage medium in which one can store magnetic signals that correspond to bits. By way of example, a recording medium includes but is not limited to a non-cache medium such as hard disks and solid state drives. As persons of ordinary skill in the art know, solid state drives also have cache and do not need to spin. Examples of non-transitory tangible computer readable storage medium include, but are not limited to, a hard drive, a hard disk, a floppy disk, a computer tape, ROM, EEPROM, nonvolatile RAM, CD-ROM and a punch card.

The abbreviation "SAN" refers to a storage area network. This type of network can be used to link computing devices to disks, tape arrays and other recording media. Data may for example be transmitted over a SAN in the form of blocks.

The abbreviation "SAP" refers to a system assist processor, which is an I/O (input/output) engine that is used by operating systems.

The abbreviation "SCSI" refers to a small computer systems interface.

The term "sector" refers to a subdivision of a track on a disk, for example a magnetic disk. Each sector stores a fixed amount of data. Common sector sizes for disks are 512 bytes (512 B), 2048 bytes (2048 B), and 4096 bytes (4K). If a chunklet is 4K in size and each sector is 512 B in size, then each chunklet corresponds to 8 sectors (4*1024/512=8). Sectors have tracks and are located on platters. Commonly, two or four platters make up a cylinder, and 255 cylinders make up hard disk and media devices.

The phrase "sector map" refers to the tool that receives calls from a host and correlates locations in a storage device where a file is stored. A sector map may for example operate under parameters that are defined by a SCSI protocol. In the present invention, the sector map may be located in a bit field of a mediator.

The term "track" refers to a circular unit within a disc that transverses all sectors. A "track sector" is a track within any one sector. A "track cluster" spans more than one sector.

Preferred Embodiments

According to one embodiment, the present invention is directed to a method for storing data on a recording medium. Other embodiments are directed to systems that implement the method and the computer program products on which executable code is stored that is capable of carrying out the method. The method provides for receipt of a file with an original file name, conversion of the data that forms the file into a set of signals for storage, and storing data that identifies the original file name and the location of the converted set of signals. This method may be carried out through the use of a manager and a mediator. Optionally, the method comprises an initial step of setting up the mediator by providing certain parameters and/or metadata in addition to the parameters.

The manger, which may comprise one or more modules and reside on a local computer, on a network or in a cloud, is configured to receive certain information itself and to transfer this information to a mediator or to control receipt of the information directly by the mediator. Thus, the methods can be designed such that information from the initiator flows through the manager to the mediator or flows directly to the mediator. The manager also may control storage of information through use of the mediator and retrieval and transmission of information.

A manager may control, communicate with and coordinate the activities of one or a plurality of mediators. For each mediator, the manager receives (or coordinates receipt of) a set of parameters. These parameters may comprise, consist essentially of or consist of one, two or all three of file system information, bootability information and partitioning information. The manager causes this information to be stored in a first set of tracks on the mediator, which may be referred to as reserve 1 or $R_1$. The file system will dictate how the reserve blocks are to be used. For example, when using NTFS, sectors 1-2 may be for a MBR (master boot record) and sector 3 may be for $MFT. Optionally, these tracks may be copied into a second set of tracks, which may be referred to as reserve 2 or $R_2$.

The manager also receives metadata. The metadata is stored in a third set of tracks on the mediator.

At the time that the manager receives the parameters and metadata, or at a later time, it may also receive one or more files for storage on a non-cache medium. Each file is received with a file name. The file name is generated by a host that transmits the file and may be defined by the host's file system. The manager, which may for example be or be a part of a SAN or NAS or combination thereof, upon receipt of the file with a file name, can automatically execute the steps described herein for storage.

The file for storage comprises, consists essentially of or consists of a plurality of digital binary signals, e.g., 0s and 1s. Typically, the digital binary signals will be organized in chunklets. Each chunklet may be defined by its length, which can be represented by the number N, wherein N is an integer number greater than 1. Within a file, the chunklets have an order. Typically, for a given file, each chunklet contains the same number of bits. If any chunklet does not have that number of bits, e.g., one or more chunklets has a smaller number of bits, the receiving system may add bits, e.g., zeroes, until all chunklets are the same size.

Optionally, the methods of the present invention then execute an algorithm that is configured to translate the chunklets into a set of coded data. This execution may for example be controlled by the manager. The coded data is also comprised of binary signals, and it is coded and stored in a manner that permits it to be converted back into the chunklets of the file. Thus, information is retained during the encoding process that permits decoding without a loss of information.

In some embodiments, each chunklet is assigned a code that consists of a plurality of 0s and/or 1s. In other embodiments, each chunklet is divided into a plurality of subunits that are each assigned a code that consists of a plurality of 0s and 1s. The subunits may be defined by a length A, wherein N/A=Y and Y is an integer. If any subunit does not have that number of bits, e.g., one or more subunits have a smaller number of bits than the number within the subunits that are configured to be converted, the system may add bits, e.g., zeroes, until all subunits are the same size. This step may for example be performed after the chunklets are divided into subunits and in the absence of first checking to see if all of the chunklets are the same size. Alternatively, and as described above, it may be performed on the chunklet level prior to dividing the chunklets into subunits.

As the above-description suggests, the algorithm may be configured to translate strings of bits into a set of coded data, and the algorithm may be designed such that the strings of bits correspond either to the chunklets or to the subunits of the chunklets. Preferably, the set of coded data is smaller than the file as received from the host or client. Regardless of whether the set of coded data is smaller than the original data, it is capable of being converted back into the chunklets of the file. As persons of ordinary skill in the art will recognize, the data that is received from the host for storage will be raw data, and thus can correspond to any document type.

The encoding can serve two independent purposes. First, by encoding the data for storage, there is increased security. Only a person or entity that knows the code will be able to decode it and to reconstruct the document. Second, if the code is created using fewer bits than the original document, then less storage space will be needed and there can be a cost savings.

Methods, systems and computer program products for encoding raw data are described in co-pending and commonly owned patent application entitled Bit Markers and Frequency Converters, U.S. Ser. No. 13/756,921, filed Feb. 1, 2013, which is incorporated by reference in its entirety. To convert the data one may use a bit marker table or a frequency converter as illustrated in the excerpted tables in the example section of this disclosure. The bit marker table or frequency converter may be stored within the mediator, the manager or elsewhere. However, the bit marker table or frequency converter is able to be in communication with the mediator and/or manager. Methods and systems for communicating with file and programs that are stored locally or remotely are well known to persons of ordinary skill in the art. As Tables I, II and III show, information may be converted and the output code can be configured to take up less space than the input because markers are used to represent groups of bits. Thus, preferably within a table, at least one, a plurality, at least 50%, at least 60%, at least 70%, at least 80%, at least 90%, or at least 95% of the markers are smaller in size than the subunits. However, there is no technological impediment to having the converted data be the same size or larger than the data received from the host.

Thus, in some embodiments, the method assigns a marker to each chunklet from a set of X markers to form a set of a plurality of markers, wherein X equals the number of different combinations of N bits within a chunklet, identical chunklets are assigned the same marker and at least one marker is smaller than the size of a chunklet. Consequently, the set of coded data comprises said plurality of markers. In other embodiments, the method assigns a marker to each subunit from a set of X markers to form a set of a plurality of markers, wherein X equals the number of different combinations of N bits within a subunit, identical subunits are assigned the same marker and at least one marker is smaller than the size of a subunit and wherein the set of coded data comprises said plurality of markers. Optionally, if a system knows (or is designed with the premise) that for a particular type of files not all combinations of N bits will be used, within the bit marker table or frequency converter may there may be fewer markers than all of the theoretically possible number or markers for a given chunklet size.

During the translation process (which also may be referred to as an encoding process) the string of bits (i.e., the chunklets or subunits) that the algorithm uses as input for the table may be pre-processed. Each of these strings of bits may be defined by a first end and a second end, and prior to assigning a marker the method further comprises analyzing each string of bits to determine if the bit at the second end has a value of 0. If the bit at the second end has a value of 0, the method may remove the bit at the second end and all subsequent bits that have a value of 0 and form a contiguous string of bits with the bit at the second end, thereby forming a string of bits of reduced size. A benefit of the preprocessing step is that a small bit marker table or frequency converter can be used. For example, Table II could be used instead of Table I to produce the same coded data. As persons of ordinary skill in the art will recognize this preprocessing can be accomplished by searching and removing instead of zeroes from the second end.

Additionally, as persons of ordinary skill in the art will recognize, Table I and Table II assign bit markers (i.e., converted bits) in a manner that is independent of the frequency of the bits in the raw data. However, as explained in example 3 below, one could assign smaller markers to raw data that is expected to appear more frequently in a document type or set of documents. This strategy takes advantage of the fact that approximately 80% of all information is contained within approximately the top 20% of the most frequent subunits. In other words, the subunits that correspond to data are highly repetitive.

As noted above, the systems of the present invention may be designed such that the algorithm for conversion is either stored within the mediator, or the manager, or within other hardware and/or software that are operably coupled to the mediator or manager. The algorithm may also cause the file name to be stored in a mediator. There are no limitations as to where the mediator is physically located. However, preferably, it is configured either to communicate with a host or a computer that is capable of communicating with a host that preferably is located remote from the mediator. The mediator is also configured to communicate, directly or indirectly (e.g., through the manager), with a recording medium, e.g., a non-cache medium where the coded set of data is stored, which optionally is remote from the mediator, any manager and the host. Thus, the mediator permits a user who identifies the file name to retrieve the set of coded data from the non-cache storage medium.

Upon receipt of the raw data, the method may cause a confirmation of receipt to be returned to the host. In one QoS (quality of service) protocol, a data file is received through an I/O and immediately sent to L1 cache. Upon receipt, an acknowledgement is sent from L1 cache back through the I/O. From L1 cache, the data file may be sent to L2 cache, which transmits an acknowledgement back to L1 cache. The L2 cache may also send the data file to a non-cache medium (NCM) for long term storage. The NCM may in turn send an acknowledgement back to L2 cache.

The mediator may reside in or be operably coupled to a heap (dynamically allocated memory) within L1 cache. Alternatively, the mediator may reside within a card, or be part of or be operably coupled to L2 cache.

As one of ordinary skill in the art knows, the decision to place the mediator in L1 versus L2 will be impacted by factors such as the frequency of use of the stored data. Thus, L1 is used to cache data that is used frequently by the system or an end user while L2 caches may be used for data that is accessed somewhat frequently.

In another QoS protocol, through the I/O, a data file is received by L1 cache. The data file is transferred to both L2 cache and the NCM from L1 cache. Each of L2 cache and the NCM send acknowledgments to L1 cache. Either before or after receiving acknowledgments from one or both of L2 cache and the NCM, L1 cache sends an acknowledgement through the I/O.

In the various embodiments of the present invention, the host will understand each file to be stored at a first storage address. The first storage address may be stored by the host in a sector map and correspond to a LUN. It may also include the start and, either implicitly or explicitly, the end of the units, sectors or blocks that correspond to a file. The first storage address will correspond to where the host believes that the file is located within a storage device or storage area network. The host will use this first address to keep track of its stored documents and to retrieve them. The first storage address is a virtual address i.e., it does not correspond to where the data is actually stored.

As persons of ordinary skill in the art will recognize, methods and systems may be used in which the host generates the first storage address and sends it along to the systems of the present invention with SCSI commands and optionally associated sector or LBA numbers. The mediator may correlate the file name, what the host thinks of as the location of the file and the storage size of the file as received from the host, i.e., the raw data and any header or footer data, with a second storage address, which is the actual storage address of the data, which may be converted. Alternatively, the mediator may store only the file name, and optionally, it may not receive the first storage address for a file. As noted above, because storage addresses are based on a linear organization of data, they may implicitly or explicitly contain the size of the stored information.

Although the paragraph above recites that the host will provide what it believes to be the first storage address, the information could be generated by another entity that either is a conduit through which the host communicates directly or indirectly with the mediator, a module within the host or operably coupled to the host, or a module within or operably coupled to the mediator and/or manager. As persons of ordinary skill in the art will recognize, the stored information that identifies a location of a data file on a storage device may be referred to as a pointer.

As noted above, the mediator may store the file name, and may or may not also store the first storage address for each file. Because in many embodiments, the coded file will be smaller than the raw data file as received from the host, less storage space is needed for it. Thus, the data needed to recreate the file can be stored in a smaller location than the host perceives is being used and than the first storage address suggests. The actual location in which the file is stored, may be referred to as a second storage address. Thus, for each file there will be a first storage address, which is where the host believes that the file is stored, and a second storage address, which is where the coded file is actually stored.

It is possible that for a given file, which may correspond to one or more blocks, a first storage address and a second storage address are located at the same block within a storage device or one or more overlapping set of blocks. However, preferably for at least one, at least 50%, at least 60%, at least 70%, at least 80%, at least 90% or 100% of the files there is no overlap of blocks within the first storage address and the second storage address. Additionally even if the host perceives the same storage address as the mediator perceives, when data is coded the host cannot recreate the file without first decoding the data. In some embodiments, the host is unaware of the code, and thus is not capable of decoding the stored data.

In some embodiments, the mediator may receive the chunklet(s) that correspond to a file and temporarily store them in a L1 or a L2 cache. If the L2 cache is present, the L2 cache may acknowledge receipt to the host, and optionally provide or confirm the first storage address to the host. As persons of ordinary skill in the art will recognize, the acknowledgement of receipt and transmission of the first storage address may be done prior to storage at the second storage address and if encoding is performed, then prior to or after the encoding.

The mediator may comprise a first reserve set of tracks ($R_1$) and a second reserve set of tracks ($R_2$). In some embodiments, the second reserve set of tracks ($R_2$) is a copy of the first reserve set of tracks ($R_1$). Additionally, in some embodiments, the method further comprises using the second reserve set of tracks ($R_2$) to check for errors in the first reserve set of tracks ($R_1$).

$R_1$ may be configured to function as the central point for host initiation. Thus, the host may select the parameters to send to $R_1$. The mediator may receive this information directly from the host or indirectly through the manager. $R_2$ is preferably never exposed to the host. Thus, only the mediator itself or the manager can cause information to be stored in $R_2$. Each of $R_1$ and $R_2$ may for example contain sixteen sectors and be filled with real data such as host modifiers. By convention, numbering may start at 0. Thus, $R_1$ may for example contain sectors (or tracks) 0-15 and $R_2$ may contain sectors (or tracks) 16-31. However, the mediator may be constructed so as to allow for expansion of each of $R_1$ and $R_2$ beyond the initial size of 16 tracks.

In some embodiments, $R_1$ contains unique reserve sector information and partition information. Within the partition information, one may store the file system information. As noted above, this information may be copied into $R_2$.

By way of a non-limiting example and as persons of ordinary skill in the art are aware, when formatting a volume with an NFTS file system, one creates metadata files such as $MFT (Master File Table), $Bitmap, $Log File and others. This metadata contains information about all of the files and folders on an NFTS volume. The first information on an NTFS volume may be a Partition Boot Sector ($Boot metadata file), and be located at sector 0. This file may describe the basic NTFS volume information and a location of the main metadata file $MFT.

The formatting program allocates the first 16 sectors for the $Boot metadata file. The first sector is a boot sector with a bootstrap code, and the following 15 sectors are the boot sector's IPL (initial program loader).

In addition to the tracks of $R_1$ and $R_2$, the mediator may store additional metadata. This metadata may for example correspond to information that allows the execution of thin provisioning strategies, which correspond to visualization technology that allows a device to give the appearance of having more physical resources than are actually available, and it may for example be contained in the eight tracks after $R_2$, which would be tracks 32-39. The metadata may also provide for features such as cubelet QoS, VM and WORM.

Finally, the mediator may also comprise a bit field. The bit field contains the information that indicates where the data is physically stored within a storage medium and if the metadata is located in tracks 32-39, the sector number of the bit field begins at track 40. Thus, it is within the bit field of the mediator that correlation between the file name of the host and the location of the data is stored. Thus, it may comprise, consist essentially or consist of a sector map. This information from the bit table component of the mediator may be used to determine the actual space saving on any device. For example, the percentage of space saved= 1−[(space actually used)/(space as mapped by host)].

As a matter of practice, preferably the mediator is not located on the disc or recording medium on which the coded data is stored. Additionally, preferably the mediator requires only about 0.1-0.2% of the total memory of the corresponding disk or recording medium.

In addition to providing economic value from the saving of the space, various embodiments of the present invention open the door for increased efficiencies when looking to protect the integrity of data. Accordingly, various embodiments of the present invention provide new and non-obvious technologies for backing-up data.

For example, in the first mediator one may correlate a data file that is stored in a first sector or first sector cluster on a first recording medium with a file name. As described above, the first mediator is configured to permit a user or entity that identifies the file name to retrieve the data file from the recording medium.

A data protection protocol may be executed that generates a second mediator. The second mediator will be an exact copy of the first mediator at a time T1. Thus, at T1, both the first mediator and the second mediator will point to the same sectors or sector clusters (and locations therein) on the first recording medium.

After time T1, for example at T2, the host may seek to update a file that is stored in a given location on a given sector or sector cluster. The host will not change the data stored at the first storage address. However, rather than causing the information on the sector or sector cluster to be written over, the first mediator may cause the new information to be written to a third storage address that corresponds to a location in a different sector or sector cluster and correlate the file name and the first storage address with this new storage address.

Thus, the first mediator will point to a new sector or sector cluster even though the host believes that the information is being overwritten at a particular storage address. Accordingly, the host will not need to update its address for the sector cluster.

Additionally, the second mediator will not be updated, and it will continue to correlate the file name with the first location at which the file was stored. This use of the two mediators will permit one to provide a snapshot of the data as it existed at T1, without causing the host to need to update its file system to indicate that the file as it existed both at T1 and at T2 are being stored. Thus, the snapshot locks all data files that are stored at time T1 and prevents anyone from deleting or writing over those physical files. However, if the host wishes to revise those files, it can work under the impression that it is doing so, when in fact new files are stored. This method is described in connection with sectors and sector clusters. However, it will also work with non-cache media that are not arranged in sectors or sector clusters. For example, they may be organized by LBAs in LUNs.

As suggested above, this method may be implemented by a system that comprises a first mediator, a second mediator and a non-cache storage medium. Each of the first mediator, the second mediator and the recording medium may be stored on or be formed from separate devices that comprise, consist essentially of or consist of non-transitory media. The afore-described system recites the use of different sectors of the same recording medium but could also be used by writing to different sectors of different recording media. Additionally, within the system the mediators and the recording media are operably coupled to one another and optionally to one or more computers or CPUs that store instructions to cause them to carry out their intended functions and to communicate through one or more portals over a network to one or more hosts. Still further, although this embodiment is described in connection with the use of two mediators, one could implement the system using two sections of the same mediator rather than two separate mediators.

The system may further be configured with a locking module. The locking module may prevent revision, overwriting or deletion at one or more blocks that have been written as of a certain time. The locking module may also be designed to allow for the writing of new blocks and revision of those new blocks that have not been locked. Thus, the locking module may be configured to permit a host, a user or a system administrator to select certain blocks that have been written as of a certain time or to select all blocks that have been written as of a certain time not to be overwritten.

Furthermore, there may be a selection module that by default sends all requests for retrieval of files and revision, overwriting or deletion through the first mediator. The selection module may also be configured to allow recovery of what a host may believe are older versions of one or more files as of the times at which the locking technology was applied. Optionally, access to the entire selection module may be restricted to persons who have authorization, e.g. a system administrator.

The aforementioned system for backing-up data is described in the context of two mediators. However, more than two mediators could be used to capture a history of stored files or versions of files.

In some embodiments the system may contain a SAN indexer. The SAN indexer may check what is in $R_1$ and $R_2$, and extract that information. This information can be put into a database that may readily be searched by, for example, text searching.

According to another method for backing up data, a clone of the non-cache media may be made. In this method, in a first medium, one correlates a plurality of file names with a plurality of locations of data that are stored on a non-cache storage medium. The first mediator is configured to permit a user who identifies a specific file name to retrieve a data file from the first non-cache storage medium that corresponds to the specific file name. Part or the entire specific file may be stored in a first sector or sector cluster.

One may make a copy of the plurality of data files (or all data files of a first non-cache storage medium) to a second non-cache storage medium and a second mediator. The second mediator is a copy of the first mediator at time T1 and is operably coupled to the second non-cache storage medium. At time T2, which is after T1, the system may save revisions to a data file that is stored in said first sector or sector cluster on the first non-cache storage medium. However, no changes would be made to the corresponding location on the second non-cache medium. As a user requests a file after T2, he or she would go through the first mediator and retrieve the most recent stored version of the file. However, the system administrator would have access to an earlier version, which would be stored on the second non-cache medium and could retrieve it by going through the second mediator.

This method may be implemented by a system that comprises a first mediator, a second mediator, a first non-cache storage medium and a second non-cache storage medium. Each of the first mediator, the second mediator and the first and second recording media for storing data files may be stored on separate devices that comprise, consist essentially of or consist of non-transitory media. Additionally, the first mediator correlates a file name that is derived from a host with a first cubelet of the first recording medium and the second mediator correlates the same file name with a second cubelet on the second recording medium. In some embodiments, the most recent file, which is stored in the first non-cache medium, has the same LUN that the legacy file has within the second non-cache medium.

Retrieval of the data as stored may be through processes and technologies that are now known or that come to be known and that a person of ordinary skill in the art would appreciate as being of use in connection with the present invention. Optionally, a manager coordinates storage and retrieval of files.

After the data is retrieved from a recording medium, if the data has been converted, then one translates the plurality of markers into bits that may be used to form chunklets. The markers may be stored such that each marker corresponds to a chunklet or each marker corresponds to a subunit and a plurality of subunits may be combined to form a chunklet. In the stored format, the markers are arranged in an order that permits recreation of bits within chunklets and recreation of the order of chunklets, in a manner that allows for recreation of the desired document or file.

If the data is converted, then in order to translate the markers into chunklets, one may access a bit marker table or a frequency converter. Within the bit marker table or frequency converter, there may be a unique marker that is associated with each unique string of bits or within each unique string of bits within the file. If the table is organized in a format similar to Table II, after translation, zeroes may be added in order to have each subunit and chunklet be the same size. When decoding, one uses the bit maker table or frequency converter in the opposite way that one would use this for coding. Optionally, instead of using the same table and reversing the input and output, one could use separate tables.

After the chunklets are formed, one will have an output that corresponds to binary data from which a file can be reconstituted. Optionally, one may associate the file with a file type. The file type will direct the recipient of the data to know which operating system should be used to open it. In some embodiments, the association with a file type is done at the initiator or client or host. In order to illustrate the various embodiments further and to provide context, reference is made below to specific hardware that one may use, which may be combined to form a system to implement the methods of the present invention.

In some embodiments, a host may generate documents and files in any manner at a first location. The documents will be generated by the host's operating system and organized for storage by the host's file system. The host's operating system may locally store in its memory, the file name. The present invention is not limited by the type of operating system or file system that a host uses. By way of a non-limiting example, the host may comprise a computer or set of computers within a network having one or more of the following hardware components: memory, storage, an input device, an output device, a graphic user interface, one or more communication portals and a central processing unit.

At that first location a SAP executes a protocol for storing the data that correlates to documents or files. The SAP formats the data into chunklets that are for example 4K in size.

The data may be sent over a SAN to a computer that has one or more modules or to a computer or set of computers that are configured to receive the data. This computer may comprise one or more of the following hardware components: memory, storage, an input device, an output device, a graphic user interface, a central processing unit and one or more communication portals that are configured to permit the communication of information with one or more hosts and one or more storage devices locally and/or over a network.

Additionally, there may be a computer program product that stores an executable computer code on hardware, software or a combination of hardware and software. The computer program product may be divided into or able to communicate with one or more modules that are configured to carry out the methods of the present invention.

In some embodiments, there may be a level 1 (L1) cache and a level 2 cache (L2). In the present invention, by way of an example, the data may be sent over a SAN to a cache and the data may be sent to the cache prior to consulting a bit marker table, prior to consulting a frequency converter, and prior to truncating bits, and/or after consulting a bit marker table, after consulting a frequency converter, and after truncating bits.

Assuming that the sector size is 512 B, for each chunklet that is 4K in size, the host will expect 8 sectors of storage to be used.

In another embodiment, the present invention provides a data storage and retrieval system. The system comprises a non-cache data storage medium, a mediator and a manager. Communication among these elements and optionally the initiator may be over a network that is wired, wireless or a combination thereof.

The non-cache data storage medium may for example comprise, consist essentially of or consist of one or more discs or solid state drives.

The mediator may comprise, consist essentially of or consist of four sets of tracks: a first set of tracks, a second set of tracks, a third set of tracks and a fourth set of tracks. The mediator is preferably stored on a non-transitory medium and is located remotely from the non-cache data storage medium. Thus, the mediator and the non-cache data storage medium are preferably not part of the same device.

The system may also contain a manager. The manager may provide the control of the receipt, processing storage and retrieval and transmission of data through the mediator. Thus, preferably, it is operably coupled to the host, the mediator and optionally operably coupled to the non-cache data storage medium. Optionally, it is located remotely from each of the mediator, the non-cache medium and the host.

The manager may be configured to carry out one or more of the following features: (a) to store data comprising one or more of file system information, bootability information and partition information in the first set of tracks; (b) to store metadata in the third set of tracks; (c) to store one or more files on the non-cache medium, wherein the one or more files are stored on the non-cache medium without any of file system information, bootability information or partition information (thus in some embodiments, only raw data is on the non-cache medium); (d) to store in the fourth set of tracks the location of each file in the non-cache medium; and (e) to store a correlation of the location of each file in the non-cache medium with a host name for a file. Preferably, the correlation of the location of each file in the non-cache medium with a host name for a file is stored in the fourth set of tracks, which correspond to a bit field.

In some embodiments, the manager is further configured to copy information in the first set of tracks ($R_1$) into the second set of tracks ($R_2$).

In some embodiments, the location of each file in the non-cache medium is not the same as the location at which the host believes the file is located.

In some embodiments, the system is configured to use a bit marker table or a frequency converter to convert the files prior to storage. The bit marker table and frequency converter may be stored in the mediator, in the manager or remotely from both in a non-transitory medium or in a computing cloud.

For purposes of further illustration, reference may be made to the figures. FIG. 1 shows a system 100 with a mediator 10 that contains $R_1$ 40 and $R_2$ 50, as well as a space for a bit field 60 and metadata files 30. The representation of the mediator is for illustrative purposes only and places no limitations on the structure of the mediator or organization within it. Also shown is a non-cache medium (NCM) 20. The non-cache medium is shown in the proximity of the mediator, but they are separate structures.

Figure 2:
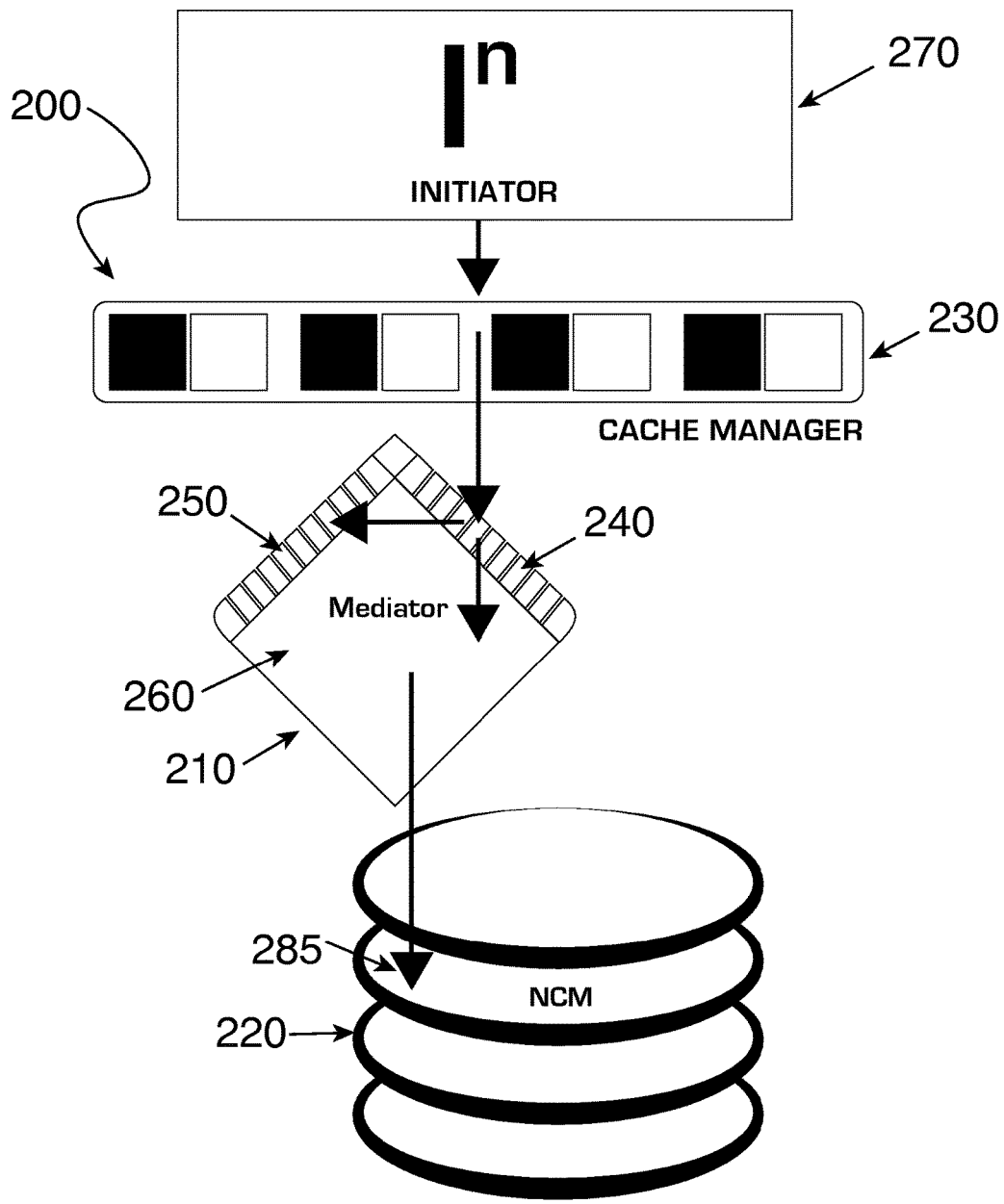
FIG. 2 is a representation of a system for storing information using a mediator.

FIG. 2 shows another system 200. In this system, the initiator (I″) 270 transmits chunklets to a cache manager 230, which optionally arranges for coding of data files and transmits them to the mediator 210. Examples of hosts include but are not limited to computers or computer networks that run Microsoft Windows Server and Desktop, Apple OS X, Linux RHEL and SUSE Oracle Solaris, IBM AIX, HP UX and VM ESX and ESXi. The information, corresponding to data files, is initially sent to $R_1$ 240, which previously was populated with parameters that the initiator defined. The mediator may itself translate the information through use of a bit marker table or a frequency converter (not shown) or it may communicate with a remote encoder (which also may be referred to as a remote converter), and the mediator will store within $R_1$ as well as within $R_2$ 250 copies of a file name that is received from the host. After the data has been converted, and a smaller size file has been created, within a sector map of the bit field 260, is recorded a location that the file will be stored in the disk 220. The coded data will be stored at location 285.

Figure 3:
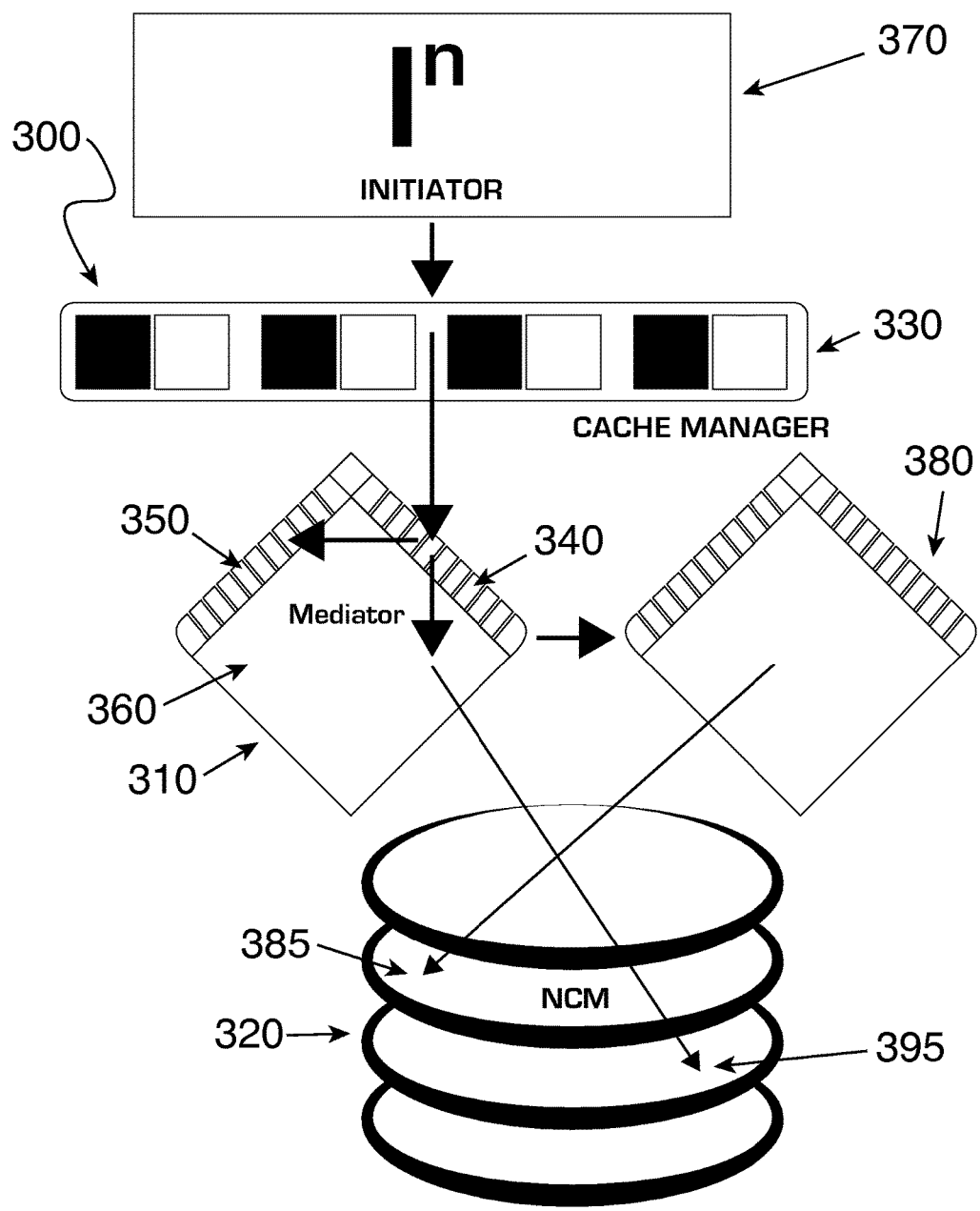
FIG. 3 is a representation of a system for using two mediators to back up information that is stored.

FIG. 3 shows another system 300 that is a variation of the embodiment of the system of FIG. 2 and that provides for back-up of storage. In this system the initiator 370 transmits chunklets to the cache manager 330, which forwards information to the mediator 310 that contains data to revise the same file that was sent for FIG. 2. Either prior to receipt of the revised file or after receipt of it, but before storage of it in the non-cache media, a second mediator 380 is created from the first mediator 310. The second mediator is an exact copy of the first mediator at the time that it was created and for the file name, at that time, points to the same sector (or sector cluster) 385 within the non-cache medium 320.

The first revised file is received at $R_1$ 340 of the first mediator. The first mediator will again either translate the information through use of a bit marker table or a frequency converter (not shown) or communicate with a remote encoder. The mediator will continue to store within $R_1$ as well as within $R_2$ 350 copies of the file name that is received from the host. After the data has been converted, and a smaller size file has been created, within a sector map of the bit field 360 of the first mediator, is recorded a location that the file will be stored in the disk 320. However, the revised file will be stored a different sector 395. Thus, the changes to the first mediator will not be made to the second mediator The host is by default in communication with the first mediator. Thus, when it wants to recall the file from storage, the first mediator will call back the data from sector 395. Should the host or a system administrator wish to obtain a previous version of the data, it could submit the file name to the second mediator, which would look to sector 385.

According to another embodiment of the present invention, an initiator that has previously provided metadata to the system of the present invention (e.g., operating system information, bootability information, partition information, document type information QoS information, etc.) sends bits that correspond to a document to a cache manager. The bits may for example be organized in chunklets.

The cache manager may send the information to L1 cache, to L2 cache and to a mediator. The cache manager may also send an acknowledgement of receipt to the initiator.

The mediator, which may already have the relevant metadata stored on it, sends the bits that correspond to the document, to a converter, which converts the bits into coded information. Associated with or part of the converter may also be a calculator, which determines the size of the converted bits. Conversion may for example be through use of a bit marker table or a frequency converter.

The converter may then tell the mediator of the size of the converted file, and the mediator may determine the location at which the converted file will be stored in a non-cache-medium. Following this step, the mediator may cause storage at that location.

According to any of the methods of the present invention, any data that is stored in a converted form is capable of being retrieved and decoded before returning it to a host. Through the use of one or more algorithms that permit the retrieval of the converted data, the accessing of the reference table or frequency converter described above and the conversion back into a uniform string of bits and chunklets, files can be recreated for hosts. By way of a non-limiting example, the data may be converted and stored in a format that contains an indication where one marker ends e.g., use of unique strings of bits.

As persons of ordinary skill in the art will recognize, the present invention is described in connection with one or two non-cache media. However, an initiator may be associated with a plurality of mediators and a plurality of non-cache media.

Any of the features of the various embodiments described herein can be used in conjunction with features described in connection with any other embodiments disclosed unless otherwise specified. Thus, features described in connection with the various or specific embodiments are not to be construed as not suitable in connection with other embodiments disclosed herein unless such exclusivity is explicitly stated or implicit from context.

EXAMPLES: PROPHETIC

Example 1: Bit Marker Table

Within a reference locator table each unique marker is identified as corresponding to unique strings of bits. The table may be stored in any format that is commonly known or that comes to be known for storing tables and that permits a computer algorithm to obtain an output that is assigned to each input.

Table I below provides an example of excerpts from a bit marker table where the subunits are 8 bits long.

TABLE I

| Bit Marker (as stored) | Subunit = 8 bits (input) |
| --- | --- |
| 0101 | 00000001 |
| 1011 | 00000010 |
| 1100 | 00000011 |

TABLE I-continued

| Bit Marker (as stored) | Subunit = 8 bits (input) |
| --- | --- |
| 1000 | 00000100 |
| 1010 | 00000101 |
| 11111101 | 11111101 |

By way of example and using the subunits identified in Table I, if the input were 00000101 00000100 00000101 00000101 00000001, the output would be: 1010 1000 1010 1010 0101. When the bit marker output is smaller than the subunit input, it will take up less space on a storage medium, and thereby conserve both storage space and the time necessary to store the bits.

As a person of ordinary skill in the art will recognize, in a given bit marker table such as that excerpted to produce Table I, if all combination of bits are to be used there will need to be $2^N$ entries, wherein N corresponds to the number of bits within a subunit. When there are 8 bits, there are 256 entries needed. When there are 16 bits in a subunit one needs $2^{16}$ entries, which equals 65,536 entries. When there are 32 bits in a subunit, one needs $2^{32}$ entries, which equals 4,294,967,296 entries. If one knows that certain strings of bits will not be used in files, then the table may allocate markers starting with the smallest ones.

Example 2: Bit Marker Table for Pre-Processed Subunits

Because as the subunit size gets larger the table becomes more cumbersome, in some embodiments, the table may be configured such that all zeroes from one end of the subunit column are missing and prior to accessing the table, all zeroes from that end of each subunit are removed. Thus, rather than a table from which Table I is excerpted, a table from which Table II is excerpted could be consulted.

TABLE II

| Bit Marker (output) | Pre-processed Subunit |
| --- | --- |
| 0101 | 00000001 |
| 1011 | 0000001 |
| 1100 | 00000011 |
| 1000 | 000001 |
| 1010 | 00000101 |
| 11111101 | 11111101 |

As one can see, in the second and fourth lines, after the subunits were pre-processed, they had fewer than eight bits. However, the actual subunits in the raw data received from the host all had eight bits. Because the system in which the methods are implemented can be designed to understand that the absence of a digit implies a zero and all absences of digits are at the same end of any truncated subunits, one can use a table that takes up less space and that retains the ability to assign unique markers to unique subunits. Thus, the methods permit the system to interpret 00000001 (seven zeroes and a one) and 0000001 (six zeroes and a one) as different.

In order to implement this method, one may deem each subunit (or each chunklet if subunits are not used) to have a first end and a second end. The first end can be either the right side of the string of bits or the left side, and the second end would be the opposite side. For purposes of illustration, one may think of the first end as being the leftmost digit and the second end as being the rightmost digit. Under this method one then analyzes one or more bits within each subunit of each chunklet to determine if the bit at the second end has a value 0. This step may be referred to as preprocessing and the subunits after they are preprocessed appear in the right column of Table II. If the bit at the second end has a value 0, the method may remove the bit at the second end and all bits that have the value 0 and form a contiguous string of bits with that bit, thereby forming a revised subunit (pre-processed subunit in the table) for any subunit that originally had a 0 at the second end.

One may use a computer algorithm that reviews each subunit to determine whether at the second end there is a 0 and if so removes the 0 to form the pre-processed subunit, which also may be referred to as a revised subunit with a revised second end at a position that was adjacent to the second end of the subunit. Next, the algorithm reviews the revised subunit to determine whether at its now revised second end there is a 0 and if so removing the 0 to form a further revised second end. In this method, the revised second end would be the location that was previously adjacent to the bit at the second end. Any further revised second end would have been two or more places away from the second end of the subunit. Thus, the term "revised" means a shortened or truncated second end. The algorithm may repeat this method for the revised subunit until a shortened chunklet is generated that has a 1 at its second end.

Example 3: Frequency Exchange

Based on empirical analysis, one can determine the frequency of each subunit within a type of document or a set of documents received from a particular host or from within a set of documents that have been received within a given timeframe, e.g., the past year or past two years. With this information, rather than look to a table as illustrated in Table I or Table II in which the subunits are organized in numerical order, one could look to a frequency converter in which the smaller bit markers are associated with subunits that are predicted most likely to appear within a file, within a type of document or within a set of documents as received from a particular host. Thus, within the frequency converter, the markers are a plurality of different sizes and markers of a smaller size are correlated with higher frequency subunits.

TABLE III

Frequency Converter

| Bit Marker (output) | Frequency | Subunit = 8 bits (input) |
|---|---|---|
| 0101 | 16% | 00000001 |
| 1000 | 15% | 00000010 |
| 11011 | 10% | 00000011 |
| 10011101 | 0.00001% | 00000100 |
| 10111110 | 0.00001% | 00000101 |
| 1100 | 15% | 11111101 |

Table III is an example of an excerpt from a frequency converter that uses the same subunits as Table I. However, one will note that the bit markers are not assigned in sequence, and instead larger bit markers are assigned to lower frequency subunits. As the table illustrates, the marker that is assigned to subunit 00000011 is twenty five percent larger than that assigned to subunit 00000001, and for subunit 11111101, despite being of high numerical value, it receives a smaller bit marker because it appears more frequently in the types of files received from the particular host. Thus, if one used Table I and the subunit 11111101 appears in 10,000 places, it would correspond to 111,111, 010,000 bits. However, if one used Table III, only 11,000, 000 bits would need to be used for storage purposes for the same information. Although not shown in this method, the subunits could be preprocessed to remove zeroes from one end or the other, and the table could be designed to contain the correlating truncated subunits.

As noted above, frequency converters can be generated based on analyses of a set of files that are deemed to be representative of data that is likely to be received from one or more hosts. In some embodiments, the algorithm that processes the information could perform its own quality control and compare the actual frequencies of subunits for documents from a given time period with those on which the allocation of marker in the frequency converter are based. Using statistical analyses it may then determine if for future uses a new table should be created that reallocates how the markers are associated with the subunits. As a person of ordinary skill in the art will recognize, Table III is a simplified excerpt of a frequency converter. However, in practice one may choose a hexadecimal system in order to obtain the correlations. Additionally, the recitation of the frequencies on which the table is based is included for the convenience of the reader, and they need not be included in the table as accessed by the various embodiments of the present invention.

Example 4: Allocation of Space in a Mediator

In a hypothetical recording medium that is 1 MB in size, a person of ordinary skill in the art may map the sectors as follows:

The 1 MB recording medium has 1,024,000 Bytes, which corresponds to 250 sectors. (1,024,000/4096=250). The geometry of the recording medium may be summarized as follows: Volume=(c*h*spt*ss), wherein
  c (number of cylinder)=7;
  h (number of heads)=255;
  spt (sectors per track)=63; and
  ss (sector size in bytes)=4096.

Within the mediator, the sectors may be allocated as follows:

TABLE IV

| Address | Actual Non-cache-media LBA |
|---|---|
| 0-15 | mediator <<Reserved 1>> "Boot Sector 0" +15 |
| 16-31 | mediator location <<Reserved 2>> Sys_Internal Only |
| 32-35 | mediator_Metadata |
| 36 | Map Data "LBA-nnnnnnnnnnnnn" |
| 37 | Map Data "LBA-nnnnnnnnnnnnn" |
| ... | Map Data "LBA-nnnnnnnnnnnnn" |
| 250 | Map Data "LBA-nnnnnnnnnnnnn" |

I claim:

1. A specialized computing system for storing electronic data on a random access memory, the system comprising:
  a processor configured to execute instructions that cause the processor to:
    receive a set of parameters, wherein the parameters comprise file system information, bootability information and partition information;
    receive metadata;
    receive one or more files, wherein each file has a file name and comprises a plurality of bits;
    store the parameters and metadata on a mediator;

encode each of the one or more files for storage in a random access memory, wherein, for each of the one or more files, encoding comprises:
dividing the plurality of bits of the file into a plurality of subunits of N bits,
using a bit marker table, assigning each subunit a bit marker to form a plurality of bit markers corresponding to an encoded file,
wherein identical subunits are assigned the same bit marker, and
wherein the bit marker table comprises a set of X markers, wherein X equals the number of different combinations of N bits within a subunit,
store, for each of the encoded files, the plurality of bit markers on the random access memory at a location; and
store on the mediator a correlation of each file name with the location on the random access memory, wherein the correlation is storable on a single mediator.

2. The system according to claim 1, wherein the encoding comprises using a bit marker table to create a converted file.

3. The system according to claim 2, wherein the converted file does not contain any of file system information, bootability information or partition information.

4. The system according to claim 1, wherein the parameters are stored in a plurality of reserve tracks.

5. The system according to claim 1, wherein the plurality of reserve tracks are a first set of reserve tracks and the method further comprises copying the parameters into a second set of reserve tracks.

6. The system according to claim 5 further comprising using the second set of reserve tracks to check for errors in the first set of reserve tracks.

7. The system according to claim 6, wherein the metadata corresponds to instructions for thin-provisioning.

8. The system according to claim 1, wherein the file is received from a host that records the file as being stored at a virtual address and the virtual address is not the same as the location of the file.

9. The method according to claim 1, wherein the encoding comprises using a frequency of occurrence of subunits in each respective file.

10. The system of claim 1, wherein at least 50% of the bit markers stored within the bit marker table are smaller in size than the subunits.

11. The system of claim 1, wherein at least 70% of the bit markers stored within the bit marker table are smaller in size than the subunits.

12. The system of claim 1, wherein at least 90% of the bit markers stored within the bit marker table are smaller in size than the subunits.

13. A data storage and retrieval system comprising:
i. a non-cache data storage medium, wherein the non-cache data storage medium comprises a random access memory;
ii. a mediator, wherein the mediator is stored remotely from the non-cache data storage medium, and the mediator comprises:
(a) a first set of tracks;
(b) a second set of tracks;
(c) a third set of tracks; and
(d) a fourth set of tracks; and
iii. a manager, wherein the manager is configured:
(a) to store data comprising file system information, bootability information and partition information in the first set of tracks;
(b) to store metadata in the third set of tracks;
(c) to encode one or more files for storage in the random access memory, wherein, for each of the one or more files, encoding comprises:
dividing the file into a plurality of subunits of N bits,
using a bit marker table, assigning each subunit a bit marker to form a plurality of bit markers corresponding to an encoded file,
wherein identical subunits are assigned the same bit marker, and
wherein the bit marker table comprises a set of X markers, wherein X equals the number of different combinations of N bits within a subunit,
(d) to store the plurality of bit markers for each the one or more encoded files on the random access memory, wherein the one or more files are stored on the random access memory without any of file system information, bootability information and partition information;
(e) to store in the fourth set of tracks the location of each file in the random access memory; and
(f) to store a correlation of the location of each file in the random access memory with a host name for a file, wherein the correlation of the location of each file is storable on a single mediator.

14. The system of claim 13, wherein the manager is further configured to copy the information in the first set of tracks into the second set of tracks.

15. The system of claim 13, wherein the location of each file in the random access memory is not the same as the location at which the host believes that the file is located.

16. The system according to claim 13, wherein the one or more files are converted to form converted files, wherein the converted files take up less space than the files from which they were converted.

17. The system according to claim 13, wherein the mediator is a first mediator and the system further comprises a second mediator and a module for copying the information within the first mediator into the second mediator.

18. The system according to claim 17, wherein the first mediator and the second mediator correlate the same file name with different locations within the non-cache data storage medium.

19. The system according to claim 17, wherein the non-cache data storage medium is a first non-cache data storage medium and the system further comprises a second non-cache data storage medium, and the first mediator correlates a file name with a location within the first non-cache data storage medium and the second mediator correlates the file name with a location within the second non-cache data storage medium.

* * * * *

UNITED STATES PATENT AND TRADEMARK OFFICE
CERTIFICATE OF CORRECTION

PATENT NO. : 10,133,636 B2
APPLICATION NO. : 13/797093
DATED : November 20, 2018
INVENTOR(S) : Brian M. Ignomirello Page 1 of 1

It is certified that error appears in the above-identified patent and that said Letters Patent is hereby corrected as shown below:

In the Specification

In Column 9, Line 15, change "instead" to --1s instead--.

In Column 10, Line 47, change "than" to --then--.

In Column 11, Line 35, change "NFTS" to --NTFS--.

In Column 11, Line 38, change "NFTS" to --NTFS--.

In the Claims

In Claim 9, Column 21, Line 42, change "method" to --system--.

In Claim 13, Column 22, Line 21, change "each the" to --each of the--.

Signed and Sealed this
Nineteenth Day of March, 2019

Andrei Iancu
*Director of the United States Patent and Trademark Office*